(12) United States Patent
Baum et al.

(10) Patent No.: US 11,560,924 B2
(45) Date of Patent: Jan. 24, 2023

(54) BEARING ASSEMBLY FOR A CHARGING APPARATUS

(71) Applicant: BorgWarner Inc., Auburn Hills, MI (US)

(72) Inventors: Christoph Baum, Kaiserslautern (DE); Karl-Ludwig Braun, Otterberg (DE); Thomas Ducker-Schulz, Neu-Bamberg (DE); Panagiotis Koutsovasilis, Mainz (DE); Christian Kramer, Guntersblum (DE); Christian Kunkler, Blieskastel (DE); Ivo Nawrath, Mainz (DE); Erdogan Pektas, Ginsheim-Gustavsburg (DE)

(73) Assignee: BorgWarner Inc., Auburn Hills, MI (US)

( * ) Notice: Subject to any disclaimer, the term of this patent is extended or adjusted under 35 U.S.C. 154(b) by 29 days.

(21) Appl. No.: 17/185,331

(22) Filed: Feb. 25, 2021

(65) Prior Publication Data

US 2021/0277935 A1 Sep. 9, 2021

(30) Foreign Application Priority Data

Mar. 3, 2020 (EP) .................................... 20160676

(51) Int. Cl.
*F16C 17/26* (2006.01)
*F16C 33/10* (2006.01)
*F01D 25/16* (2006.01)

(52) U.S. Cl.
CPC .............. *F16C 17/26* (2013.01); *F01D 25/16* (2013.01); *F16C 33/1045* (2013.01); *F16C 2360/23* (2013.01)

(58) Field of Classification Search
CPC .......... F16C 17/18; F16C 17/26; F16C 27/02; F16C 33/1045; F16C 33/106;
(Continued)

(56) References Cited

U.S. PATENT DOCUMENTS 4,640,630 A * 2/1987 Yoshioka .............. F16C 23/041
384/129
5,870,894 A 2/1999 Woollenweber et al.
(Continued)

FOREIGN PATENT DOCUMENTS

CN 204827541 U 12/2015
DE 102017213492 A1 2/2019
(Continued)

OTHER PUBLICATIONS

English language abstract and machine-assisted English translation for JP 2010-127318 A extracted from espacenet.com database on Mar. 9, 2022, 25 pages.
(Continued)

*Primary Examiner* — James Pilkington
(74) *Attorney, Agent, or Firm* — Howard & Howard Attorneys PLLC

(57) ABSTRACT

A bearing assembly for a charging apparatus. The bearing assembly comprises a bearing housing and a shaft. The bearing assembly further comprises a compressor-side bearing bushing and a turbine-side bearing bushing which together support the shaft inside a bearing bore of the bearing housing. The compressor-side bearing bushing is configured differently than the turbine-side bearing bushing.

14 Claims, 15 Drawing Sheets

(58) Field of Classification Search
CPC .. F16C 2360/23; F16C 2360/24; F01D 25/16; F01D 25/18; F02C 7/06; F05D 2240/53; F05D 2240/54
See application file for complete search history.

(56) References Cited

U.S. PATENT DOCUMENTS

| | | |
|---|---|---|
| 10,161,265 B2 | 12/2018 | Isayama et al. |
| 10,526,960 B2 | 1/2020 | Kojima et al. |
| 2008/0098735 A1 | 5/2008 | Gutknecht |
| 2013/0108483 A1 | 5/2013 | Becker et al. |
| 2015/0147204 A1 | 5/2015 | Boening et al. |
| 2017/0045085 A1 | 2/2017 | Sugiura et al. |

FOREIGN PATENT DOCUMENTS

| | | | |
|---|---|---|---|
| JP | S57157817 A | 9/1982 | |
| JP | 2007127063 A | 5/2007 | |
| JP | 2010127318 A | 6/2010 | |
| WO | WO-2016028501 A1 * | 2/2016 | ............. F01D 25/16 |

OTHER PUBLICATIONS

English language abstract and machine-assisted English translation for CN 204827541 U extracted from espacenet.com database on Mar. 3, 2021, 11 pages.

Machine-assisted English language abstract and machine-assisted English translation for DE 10 2017 213 492 A1 extracted from espacenet.com database on Mar. 3, 2021, 11 pages.

English language abstract and machine-assisted English translation for JPS 57-157817 A extracted from espacenet.com database on Mar. 3, 2021, 4 pages.

English language abstract and machine-assisted English translation for JP 2007-127063 A extracted from espacenet.com database on Mar. 3, 2021, 8 pages.

U.S. Appl. No. 17/185,305, filed Feb. 25, 2021.

* cited by examiner

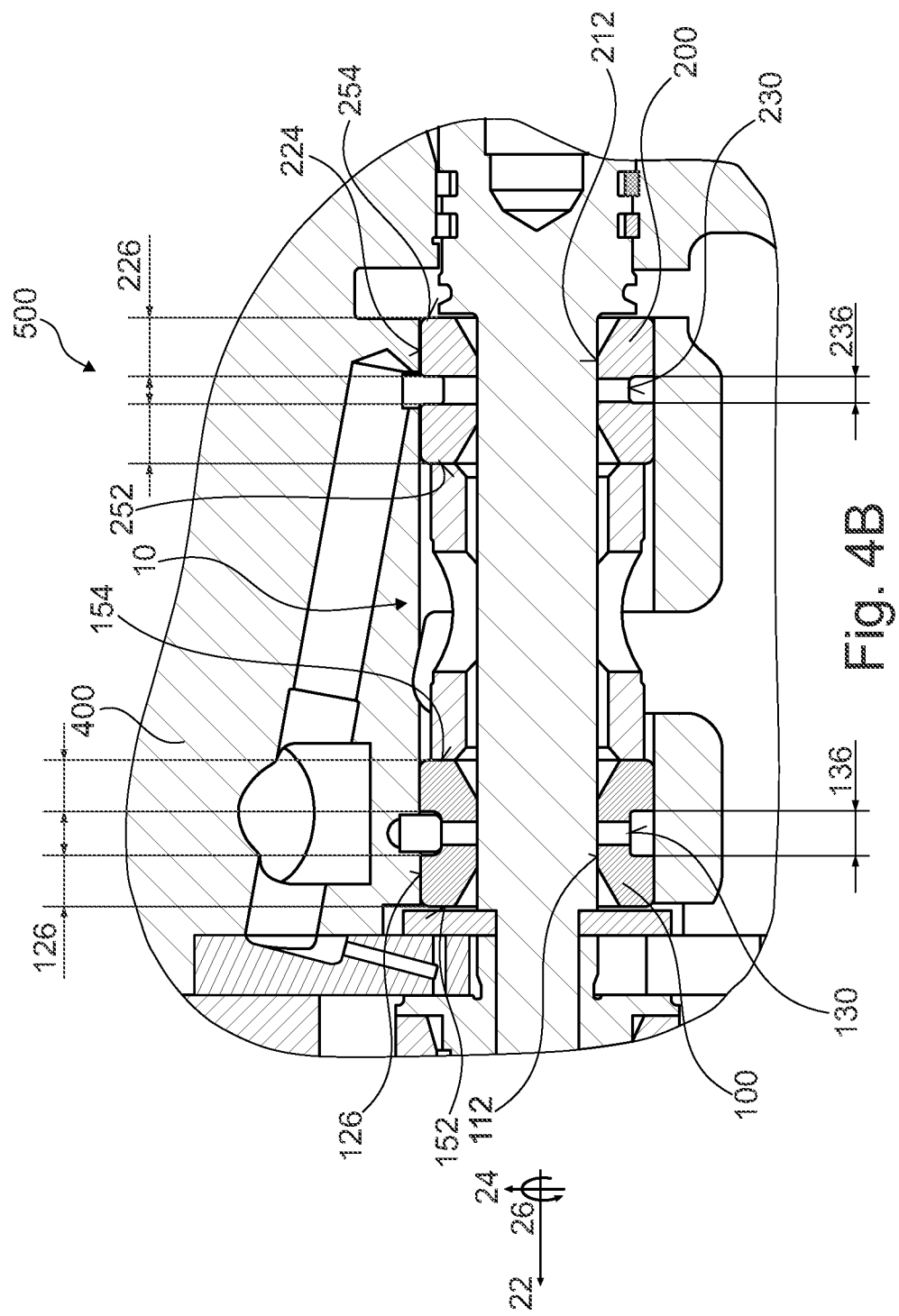

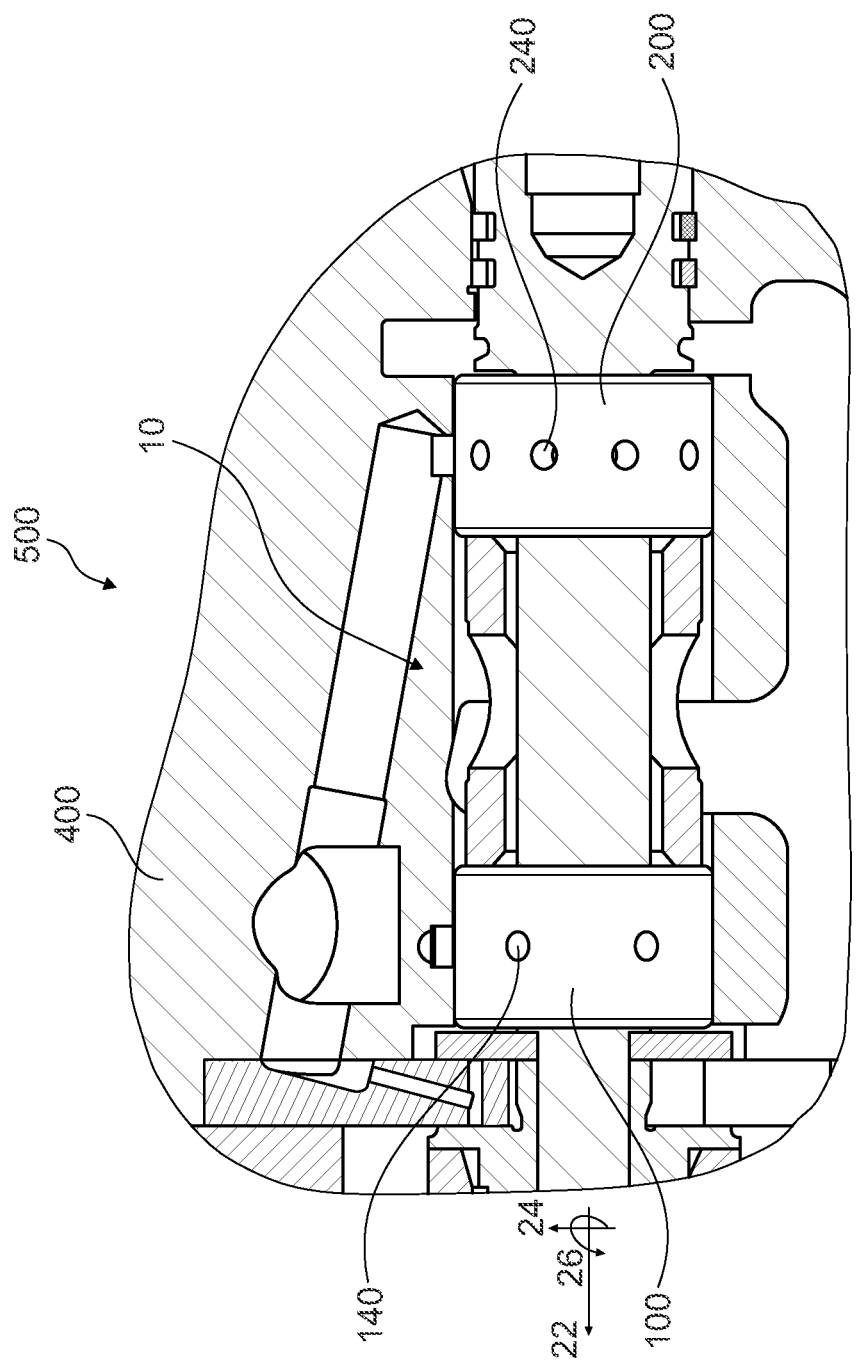

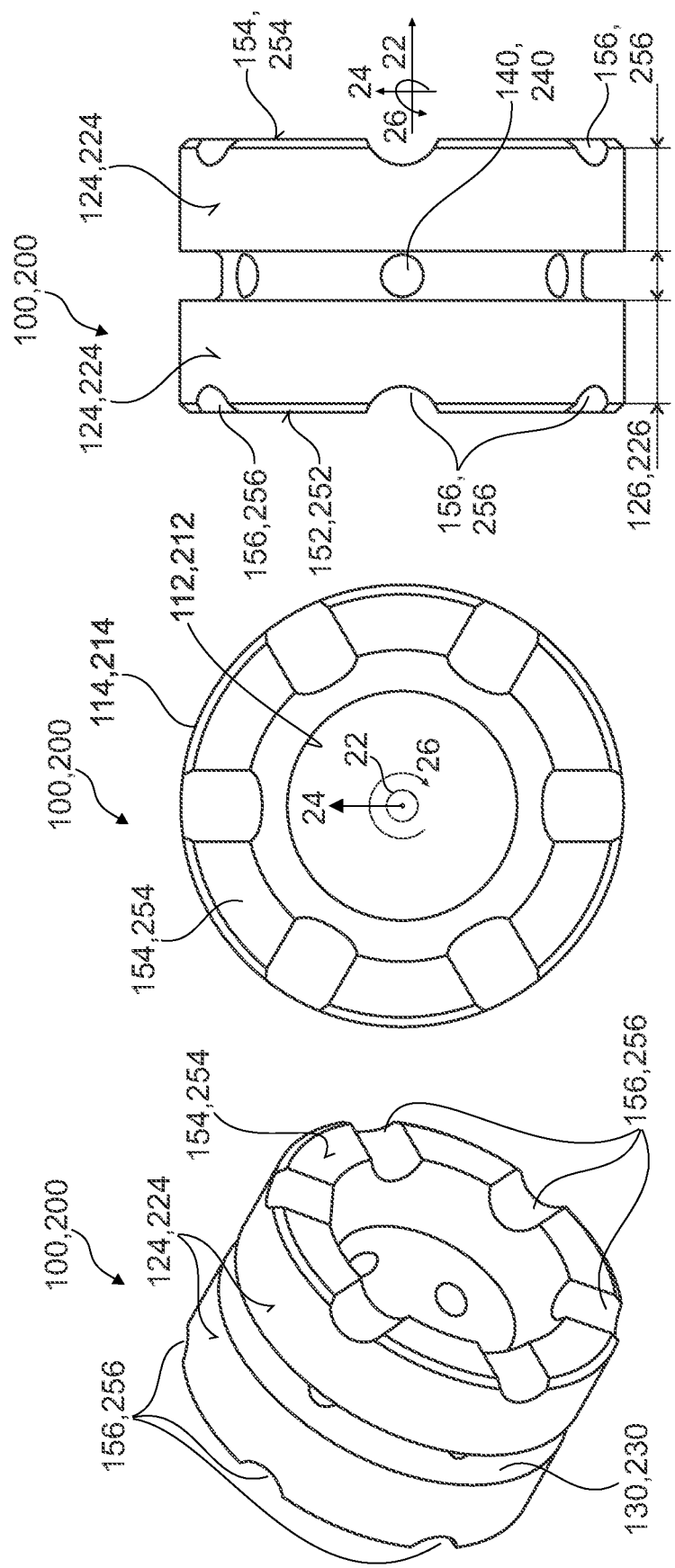

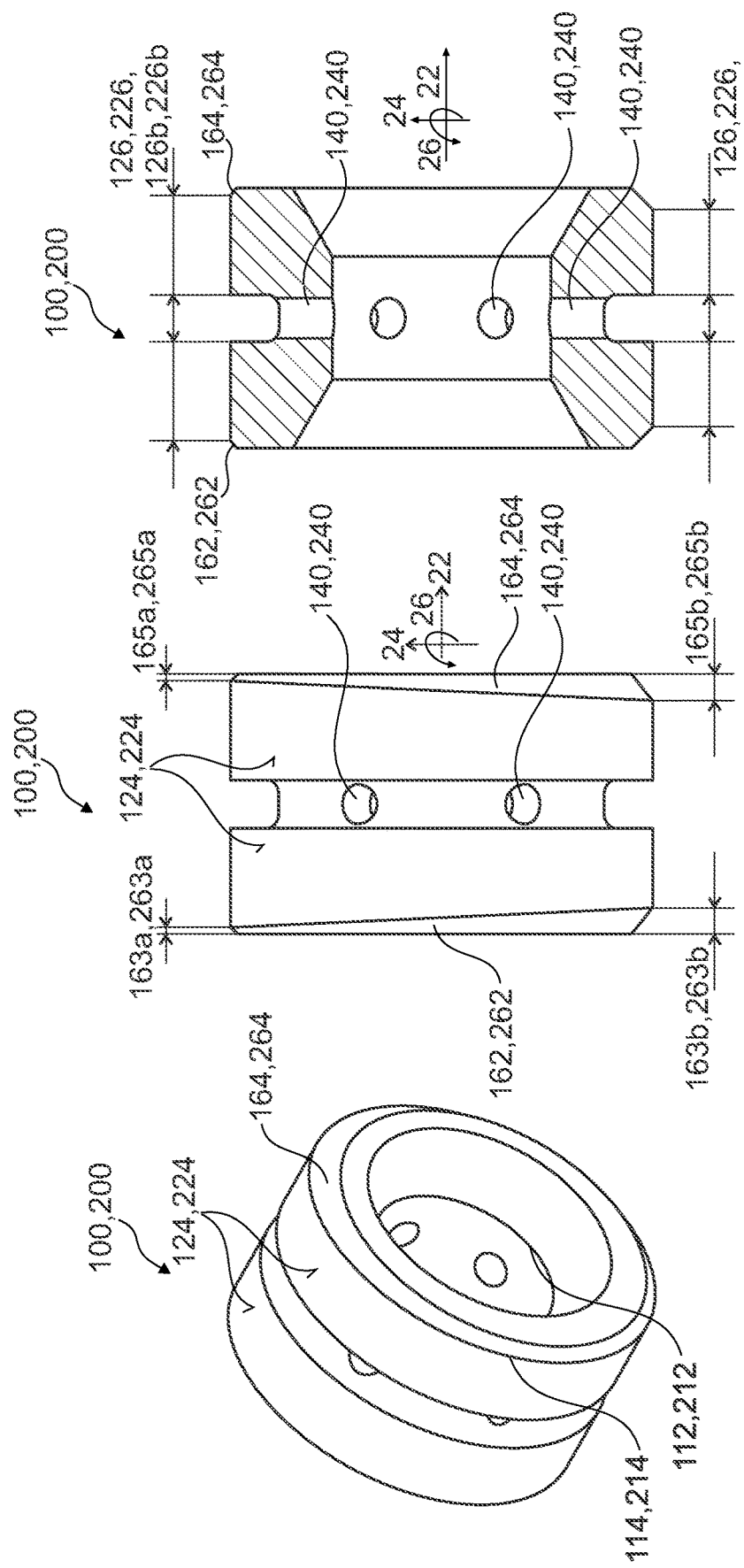

BEARING ASSEMBLY FOR A CHARGING APPARATUS

CROSS-REFERENCE TO RELATED APPLICATIONS

This application claims priority pursuant to 35 U.S.C. 119(a) of European Patent Application No. 20160676.1, filed Mar. 3, 2020, which application is incorporated herein by reference in its entirety.

TECHNICAL FIELD

This disclosure relates to a bearing assembly for a charging apparatus and a charging apparatus comprising such a bearing assembly.

BACKGROUND

The individual mobility sector is experiencing a disruptive change. Especially, the increasing number of electric vehicles entering the market demands higher efficiencies from traditional internal combustion engine (ICE) vehicles. Therefore, more and more vehicles are equipped with efficiency increasing measures, such as charging apparatuses and emission reduction devices. Well known are, for instance, charging apparatuses wherein a compressor may be driven by an e-motor (e-charger) and/or an exhaust gas powered turbine (turbocharger). Generally, an exhaust gas turbocharger has a turbine with a turbine wheel, which is driven by the exhaust gas flow of the combustion engine. A compressor with a compressor wheel is arranged on a common shaft with the turbine wheel in the case of an exhaust gas turbocharger and with an e-motor in the case of an e-charger, respectively. The compressor compresses the fresh air which is drawn in for the engine. This increases the amount of air or oxygen available to the engine for combustion. This in turn increases the performance of the combustion engine.

In many known charging apparatuses, the shaft is mounted in a bearing housing via a hydrodynamic bearing assembly. The bearing assembly regularly comprise a compressor-side bearing bushing and a turbine-side (or e-motor-side) bearing bushing which surround the shaft in a bearing bore of the bearing housing. Thereby, the shaft is radially supported. In common bearing assemblies, lubricant, for instance oil is provided to the bearing assembly to build up a hydrodynamic bearing film between the bushings and the bearing bore, and between the shaft and the bushings, respectively. In that, a semi-floating or full-floating bearing is achieved.

In the state of the art, various bearing assemblies for charging apparatuses suffer from insufficient rotor stability and low performance of constant tone and unbalance acoustics. Therefore, one of the main challenges of these bearing assemblies is to improve the noise vibration and harshness (NVH) behavior of the bearing assembly. This task is crucial, as a suboptimal NVH behavior may propagate through the structure, may thereby adversely affect the whole charging apparatus and may eventually lead to a complete system failure.

Accordingly, the objective of the present invention is to provide a bearing assembly for a charging apparatus with improved NVH behavior.

SUMMARY

The present invention relates to a bearing assembly for a charging apparatus according to claims 1 and 13. Furthermore, the invention relates to a charging apparatus having such a bearing assembly according to claim 15. Other configurations are described in the dependent claims.

In a first embodiment, the inventive bearing assembly for a charging apparatus comprises a bearing housing, a shaft, a compressor-side bearing bushing and a turbine-side bearing bushing. The compressor-side bearing bushing and the turbine-side bearing bushing together support the shaft inside a bearing bore of the bearing housing. The compressor-side bearing bushing is configured differently than the turbine-side bearing bushing. The main effect which can be achieved by configuring the compressor-side bearing bushing differently than the turbine-side bearing bushing is that both bearing bushings eventually rotate at different speeds during operation. In other words, this means that the compressor-side bearing bushing rotates at a different speed than the turbine-side bearing bushing. This leads to the advantage that synchronization effects of lubricant film vibrations can be prevented. By disturbing the superposition of natural frequencies of the lubricant, i.e. by disturbing synchronization effects, the acoustic and vibration transfer into the periphery can be limited, and thus, an improved NVH behavior can be achieved.

In a first refinement of the first embodiment, a compressor-side outer lubrication gap of the compressor-side bearing bushing may be smaller than a turbine-side outer lubrication gap of the turbine-side bearing bushing. Thereby, different amounts of lubricant are present at the bearing bushings which leads to unequal breaking torques due to unequal shear forces in the lubricant film on the compressor-side bearing bushing and on the turbine-side bearing bushing, respectively. The unequal breaking torques cause the bearing bushings to rotate at different speeds. In that, the superposition of natural frequencies of the lubricant can be disturbed, i.e. synchronization effects can be prevented. In an optional aspect of this first refinement, it is particularly advantageous if the turbine-side outer lubrication gap is configured larger compared to the standard configuration of the turbine-side outer lubrication gap as this leads in a synergetic way to an improved cooling effect on the turbine-side bearing bushing.

In another aspect of the first refinement, which is combinable with the previous aspect, a difference between the compressor-side outer lubrication gap and the turbine-side outer lubrication gap may at room temperature be at least 6.5% and preferably around 10% of the compressor-side outer lubrication gap. More precisely, the difference between a minimum compressor-side outer lubrication gap and a minimum turbine-side outer lubrication gap may at room temperature be at least 6.5% and preferably around 10% of the minimum compressor-side outer lubrication gap. The difference between the minimum compressor-side outer lubrication gap and the minimum turbine-side outer lubrication gap should preferably not be more than 35% of the minimum compressor-side outer lubrication gap. Alternatively, a difference between an average compressor-side outer lubrication gap and an average turbine-side outer lubrication gap may at room temperature be at least 5.5% and preferably at least 8.5% of the average compressor-side outer lubrication gap. The difference between the average compressor-side outer lubrication gap and the average turbine-side outer lubrication gap should preferably not be more than 25% of the average compressor-side outer lubrication gap. Having a targeted difference between the minimum gaps of around or at least 10% leads a particular effective prevention of synchronization effects. A minimum outer lubrication gap is to be understood as the minimum acceptable outer lubrication gap due to manufacturing tolerances. Analogously, an average outer lubrication gap will be understood by the skilled person as the outer lubrication gap based on the targeted dimensions without considering manufacturing tolerances.

In another aspect of the first refinement, which is combinable with any one of the previous aspects, a compressor-side inner lubrication gap of the compressor-side bearing bushing may be equal to a turbine-side inner lubrication gap of the turbine-side bearing bushing. Thereby, tilting of the shaft is prevented or at least reduced which consequently leads to an improved motion and stabilization of the shaft whilst still preventing synchronization effects.

In a second refinement, which is combinable with the previous refinement, a depth of a compressor-side circumferential lubricant groove of the compressor-side bearing bushing may be different than a depth of a turbine-side circumferential lubricant groove of the turbine-side bearing bushing. The different depths of the circumferential lubricant grooves affect lubricant supply bores of the bearing bushings such that bore depths of the lubricant supply bores are different on the compressor-side bearing bushing and the turbine-side bearing bushing. This leads to different lever arms of the lubricant inside the lubricant supply bores and thereby to different centrifugal forces and counter pressures in lubricant supply bores of the compressor-side bearing bushing and the turbine-side bearing bushing, respectively. Consequently, different amounts of lubricant are present in the respective inner and outer lubrication gaps due to different lubricant throughputs. Thereby unequal lubricant film temperatures and viscosities are built up at the compressor-side bearing bushing and at the turbine-side bearing bushing, respectively. Due to the unequal lubricant film temperatures, the transmission of drive torque between the shaft and the bearing bushings is different (and also the breaking torque between the bearing bushings and the bearing housing may be effectuated) which causes the bearing bushings to rotate at different speeds. In that, the superposition of natural frequencies of the lubricant can be disturbed, i.e. the synchronization effects can be prevented.

In an aspect of the second refinement, the depth of the turbine-side circumferential lubricant groove may be smaller than the depth of the compressor-side circumferential lubricant groove. This leads to a reduced lubricant throughput to the inner lubrication gap at the turbine-side bearing bushing which again leads to a decreased drive torque transmission between the shaft and the turbine-side bearing bushing due to a higher lubricant film temperature in the inner lubrication gap of the turbine-side bearing bushing compared to the compressor-side bearing bushing. Alternatively or additionally, the depth of the turbine-side circumferential lubricant groove may be 5% to 90%, preferably 15% to 80% and most preferably 25% to 50% smaller than the depth of the compressor-side circumferential lubricant groove.

In another aspect of the second refinement and alternatively to the previous aspect, the depth of the compressor-side circumferential lubricant groove may be smaller than the depth of the turbine-side circumferential lubricant groove. This leads to a reduced lubricant throughput to the inner lubrication gap at the compressor-side bearing bushing which again leads to a decreased drive torque transmission between the shaft and the compressor-side bearing bushing due to a higher lubricant film temperature in the inner lubrication gap of the compressor-side bearing bushing compared to the turbine-side bearing bushing. Alternatively or additionally, the depth of the compressor-side circumferential lubricant groove may be 5% to 90%, preferably 15% to 80% and most preferably 25% to 50% smaller than the depth of the turbine-side circumferential lubricant groove.

In a third refinement, which is combinable with any one of the previous refinements, a width of a compressor-side circumferential lubricant groove of the compressor-side bearing bushing may be different than a width of a turbine-side circumferential lubricant groove of the turbine-side bearing bushing. By the provision of different widths of the lubricant grooves, a width of a compressor-side outer jacket surface of the compressor-side bearing bushing is also different from a width of a turbine-side outer jacket surface of the turbine-side bearing bushing. That means the radially outer bearing surfaces (i.e. the outer jacket surfaces) of the bearing bushings are unequally sized on the compressor-side bearing bushing and on the turbine-side bearing bushing. Having different widths on the outer jacket surfaces, i.e. having different effective outer bearing surfaces leads to different resulting breaking torques from the shear forces in the lubricant film. Due to different resulting breaking torques from the frictional shear forces in the lubricant film different rotation speeds of bearing bushings 100, 200 are achieved. In that, the superposition of natural frequencies of the lubricant can be disturbed, i.e., the synchronization effects can be prevented.

In an aspect of the third refinement, the width of the turbine-side circumferential lubricant groove may be smaller than the width of the compressor-side circumferential lubricant groove. Thereby, more braking torque is acting on the turbine-side bearing bushing compared to the compressor-side bearing bushing. Consequently, the turbine-side bearing bushing rotates slower than the compressor-side bearing bushing during operation. Alternatively or additionally, the width of the turbine-side circumferential lubricant groove may be 5% to 50%, preferably 10% to 40% and most preferably 15% to 25% smaller than the width of the compressor-side circumferential lubricant groove.

In another aspect of the third refinement and alternatively to the previous aspect, the width of the compressor-side circumferential lubricant groove may be smaller than the width of the turbine-side circumferential lubricant groove. Thereby, more braking torque is acting on the compressor-side bearing bushing compared to the turbine-side bearing bushing. Consequently, the compressor-side bearing bushing rotates slower than the turbine-side bearing bushing during operation. Alternatively or additionally, the width of the compressor-side circumferential lubricant groove may be 5% to 50%, preferably 10% to 40% and most preferably 15% to 25% smaller than the width of the turbine-side circumferential lubricant groove.

In a fourth refinement, which is combinable with any one of the previous refinements, a number of lubricant supply bores of the compressor-side bearing bushing may be different than a number lubricant supply bores of the turbine-side bearing bushing. By the provision of different numbers of lubricant supply bores on the compressor-side bearing bushing and on the turbine-side bearing bushing a different lubricant throughput is achieved on the turbine side than on the compressor side. This results in different throttle effects from the outer circumference of the respective bearing bushing to the inner circumference of the respective bearing bushing and thereby leads to different amounts of lubricant in the inner lubrication gaps. Consequently, different lubricant film temperatures and viscosities are built up in the inner lubrication gaps and thereby the transmission of drive torque between the shaft and the bearing bushings is different which causes the bearing bushings to rotate at different speeds. In that, the superposition of natural frequencies of the lubricant can be disturbed, i.e. the synchronization effects can be prevented.

In an aspect of the fourth refinement, the number of lubricant supply bores of the compressor-side bearing bushing may be smaller than the number lubricant supply bores of the turbine-side bearing bushing. Alternatively or additionally, the compressor-side bearing bushing may comprise at least one lubricant supply bore less than the turbine-side bearing bushing. Alternatively or additionally, the compressor-side bearing bushing may comprise at least two lubricant supply bores less than the turbine-side bearing bushing. Alternatively or additionally, the compressor-side bearing bushing may comprise four lubricant supply bores and the turbine-side bearing bushing comprises six lubricant supply bores.

In another aspect of the fourth refinement and alternatively to the previous aspect, the number of lubricant supply bores of the compressor-side bearing bushing may be larger than the number of lubricant supply bores of the turbine-side bearing bushing. Alternatively or additionally, the compressor-side bearing bushing may comprise at least one lubricant supply bore more than the turbine-side bearing bushing. Alternatively or additionally, the compressor-side bearing bushing may comprise at least two lubricant supply bores more than the turbine-side bearing bushing. Alternatively or additionally, the compressor-side bearing bushing comprises six lubricant supply bores and the turbine-side bearing bushing comprises four lubricant supply bores.

In a fifth refinement, which is combinable with any one of the previous refinements, one of a compressor-side outer jacket surface of the compressor-side bearing bushing or a turbine-side outer jacket surface of the turbine-side bearing bushing may vary in width along an outer circumference. That means a profile of width of a compressor-side outer jacket surface of the compressor-side bearing bushing is different from a profile of width a turbine-side outer jacket surface of the turbine-side bearing bushing. That means the radially outer bearing surfaces (i.e. the outer jacket surfaces) of the bearing bushings are unequally sized on the compressor-side bearing bushing and on the turbine-side bearing bushing which leads to different breaking torque due to fluid friction. The different breaking torques, cause the bearing bushings to rotate at different speeds. In that, the superposition of natural frequencies of the lubricant can be disturbed, i.e. the synchronization effects can be prevented. Additionally, the compressor-side bearing bushing may comprise a first ring face and a second ring face opposing the first ring face, and wherein the turbine-side bearing bushing may comprise a first ring face and a second ring face opposing the first ring face. Additionally, the first ring face of the compressor-side bearing bushing may face in the same direction as the first ring face of the turbine-side bearing bushing.

In a first main aspect of the fifth refinement, at least one of the ring faces of the compressor-side bearing bushing or of the turbine-side bearing bushing may comprise at least one scallop. In particular, only one scallop may be provided on only one of the ring faces of the compressor-side bearing bushing or of the turbine-side bearing bushing to achieve the advantageous effect of interfering with the respective outer jacket surface. In detail, the scallop reduces the respective outer jacket surface. By interrupting and/or reducing the respective outer jacket surface, less breaking torque is acting on the respective bearing bushing, which causes that bearing bushing including the scallop to rotate at a higher speed than the other bearing bushing which does not comprise scallops (or less scallops or scallops which reduce the outer jacket surface to a lesser extent). Furthermore, by the provision of the scallop (or scallops) a non-uniform bearing load can be provided over the circumference, i.e. the inner circumference and/or the outer circumference of the bearing bushing which comprises the scallop (or scallops). In that, the superposition of natural frequencies of the lubricant can be disturbed, i.e. the synchronization effects can be prevented. Alternatively, a plurality of scallops may be arranged on the respective first or second ring face of the compressor-side bearing bushing or of the turbine-side bearing bushing. A plurality of scallops further intensifies the advantageous effects explained further above with respect to only one scallop. The plurality of scallops may be distributed equally spaced or unequally spaced on the respective ring face in a circumferential direction. Thereby the area reduction of the respective outer jacket surface can be increased. Additionally or alternatively, at least one of the at least two scallops may comprise a different size than another one of the at least two scallops. This further intensifies the disturbance of the superposition of natural frequencies of the lubricant.

In an aspect of the first main aspect of the fifth refinement, which is combinable with any one of the previous aspects, both the first ring face and the second ring face of the compressor-side bearing bushing or both the first ring face and the second ring face of the turbine-side bearing bushing may comprise at least one scallop. Similarly, as explained above, only one, at least two or a plurality of scallops may be arranged on the respective first and second ring face of the compressor-side bearing bushing or of the turbine-side bearing bushing. A plurality of scallops further intensifies the advantageous effects explained further above with respect to only one scallop. The numbers of scallops on the first ring face may be different than the number of scallops of the second ring face. Additionally or alternatively, at least one of the at least two scallops may comprise a different size than another one of the at least two scallops. The plurality of scallops may be distributed equally spaced or unequally spaced on the respective ring face in a circumferential direction. This further intensifies the disturbance of the superposition of natural frequencies of the lubricant.

In a second main aspect of the fifth refinement, which is combinable with the first main aspect of the fifth refinement, at least one, in particular only one, of the ring faces of the compressor-side bearing bushing or of the turbine-side bearing bushing may be inclined with respect to a radial plane such that the respective outer jacket surface width varies, in particular varies constantly, between a minimum width and a maximum width of the compressor-side outer jacket surface or the turbine-side outer jacket surface, respectively. Alternatively, both the first ring face and the second ring face of the compressor-side bearing bushing or both the first ring face and the second ring face of the turbine-side bearing bushing may be inclined with respect to a radial plane such that the respective width varies, in particular varies constantly, between a minimum width and a maximum width of the compressor-side outer jacket surface or the turbine-side outer jacket surface, respectively. Additionally, the respective first ring face may be inclined in an opposite direction to the respective second ring face. Alternatively, the respective first ring face may be inclined in the same direction as the respective second ring face but by a different amount. Additionally or alternatively, the minimum width may be 55% to 99%, preferably 75% to 95% and most preferably 85% to 90% of the maximum width. Similar, as explained further above with respect to the first main aspect of the fifth refinement, the configuration according to the second main aspect of the fifth refinement may lead to different rotational speeds of the bearing bushings and/or to non-uniform bearing loads over the circumference, i.e. the inner circumference and/or the outer circumference of the respective bearing bushing. In that, the superposition of natural frequencies of the lubricant can be disturbed, i.e. the synchronization effects can be prevented.

In a third main aspect of the fifth refinement, which is combinable with any one of previous main aspects of the fifth refinement, the compressor-side bearing bushing may comprise a first chamfer and a second chamfer opposing the first chamfer. The turbine-side bearing bushing may comprise a first chamfer and a second chamfer opposing the first chamfer. Additionally, the first chamfer of the compressor-side bearing bushing may face in the same direction as the first chamfer of the turbine-side bearing bushing. Additionally, a width of at least one of the chamfers of the compressor-side bearing bushing or of the turbine-side bearing bushing varies in the circumferential direction. The width of at least one of the chamfers may vary such that also the width of the compressor-side outer jacket surface or the turbine-side outer jacket surface is varied in the circumferential direction. Thereby, different rotational speeds of the bearing bushings and/or non-uniform bearing loads over the circumference, i.e. the inner circumference and/or the outer circumference of the respective bearing bushing can be achieved. In that, the superposition of natural frequencies of the lubricant can be disturbed, i.e. the synchronization effects can be prevented.

In an aspect of the third main aspect of the fifth refinement, the width of at least one of the chamfers may vary, in particular may vary constantly, between a minimum width and a maximum width. Thereby, the surface width of the respective compressor-side outer jacket surface or the turbine-side outer jacket surface is also varied constantly between a minimum width and a maximum width. Additionally or alternatively, the width of the first chamfer and the width of the second chamfer of the compressor-side bearing bushing may vary in the circumferential direction. Alternatively, the width of the first chamfer and the width of the second chamfer of the turbine-side bearing bushing may vary in the circumferential direction.

Additionally, the respective widths of both chamfers of the compressor-side bearing bushing may vary, in particular vary constantly, between a minimum width and a maximum width. Additionally, the respective maximum widths may be arranged at the same circumferential position. Additionally, the respective minimum widths and/or the respective maximum widths may be the same.

Alternatively to the previous aspect, the respective widths of both chamfers of the turbine-side bearing bushing may vary, in particular may constantly vary, between a minimum width and a maximum width. Additionally, the respective maximum widths may be arranged at the same circumferential position. Additionally, the respective minimum widths and/or the respective maximum widths may be the same.

In another aspect, which is combinable with any one of the previous aspects, the bearing bushings are configured to achieve different rotation speeds during operation.

In a second embodiment, the inventive bearing assembly for a charging apparatus comprises a bearing housing, a shaft, a compressor-side bearing bushing and a turbine-side bearing bushing. The compressor-side bearing bushing and the turbine-side bearing bushing together support the shaft inside a bearing bore of the bearing housing. A compressor-side outer jacket surface of the compressor-side bearing bushing and a turbine-side outer jacket surface of the turbine-side bearing bushing vary in width along an outer circumference. The main effect which can be achieved by configuring both bearing bushings to have varying outer jacket widths over the circumference is that different profiles of breaking torque and non-uniform bearing loads at different circumferential positions on the respective outer jacket surface are achieved. Thereby, a desynchronization of the compressor-side bearing bushing from the turbine-side bearing bushing can be achieved which can disturb the superposition of natural frequencies of the lubricant on both sides, i.e. the synchronization effects can be prevented. By disturbing synchronization effects, the acoustic and vibration transfer into the periphery can be limited, and thus, an improved NVH behavior can be achieved. That means a profile of width of a compressor-side outer jacket surface of the compressor-side bearing bushing and a profile of width a turbine-side outer jacket surface of the turbine-side bearing bushing vary in circumferential direction. That means the radially outer bearing surfaces (i.e. the outer jacket surfaces) of each bearing bushing are unequally sized in circumferential direction. This leads to different profiles of breaking torque and non-uniform bearing loads at different circumferential positions on the respective outer jacket surface. In that, the superposition of natural frequencies of the lubricant can be disturbed, i.e. the synchronization effects can be prevented. Additionally, the compressor-side bearing bushing may comprise a first ring face and a second ring face opposing the first ring face, and wherein the turbine-side bearing bushing may comprise a first ring face and a second ring face opposing the first ring face. Additionally, the first ring face of the compressor-side bearing bushing may face in the same direction as the first ring face of the turbine-side bearing bushing.

In a first main aspect of the second embodiment, at least one of the ring faces of the compressor-side bearing bushing and at least one of the ring faces of the turbine-side bearing bushing may comprise at least one scallop. In particular, only one scallop may be provided on the at least one ring face of the compressor-side bearing bushing and of the turbine-side bearing bushing to achieve the advantageous effect of interfering with the respective outer jacket surface. In detail, the scallop reduces the respective outer jacket surface. By interrupting and/or reducing the respective outer jacket surface, less breaking torque is acting on the respective bearing bushing, which causes that bearing bushing including the scallop to rotate at a higher speed than the other bearing bushing which may comprise less scallops or scallops which reduce the outer jacket surface to a lesser extent. Furthermore, by the provision of the scallop (or scallops) a non-uniform bearing load can be provided over the circumference, i.e. the inner circumference and/or the outer circumference of the bearing bushing which comprises the scallop (or scallops). In that, the superposition of natural frequencies of the lubricant can be disturbed, i.e. the synchronization effects can be prevented. Alternatively, a plurality of scallops may be arranged on the respective first or second ring face of the compressor-side bearing bushing and of the turbine-side bearing bushing. The plurality of scallops may be distributed equally spaced or unequally spaced on the respective ring face in a circumferential direction. A plurality of scallops further intensifies the advantageous effects explained further above with respect to only one scallop. Thereby the area reduction of the respective outer jacket surface can be increased. Additionally or alternatively, at least one of the at least two scallops may comprise a different size than another one of the at least two scallops.

This further intensifies the disturbance of the superposition of natural frequencies of the lubricant.

In an aspect of the first main aspect of the second embodiment, which is combinable with any one of the previous aspects, both the first ring face and the second ring face of the compressor-side bearing bushing and both the first ring face and the second ring face of the turbine-side bearing bushing may comprise at least one scallop. Similarly, as explained above, only one, at least two or a plurality of scallops may be arranged on the respective first and second ring face of the compressor-side bearing bushing and of the turbine-side bearing bushing. The numbers of scallops on the first ring face may be different than the number of scallops of the second ring face. Additionally or alternatively, at least one of the at least two scallops may comprise a different size than another one of the at least two scallops. The plurality of scallops may be distributed equally spaced or unequally spaced on the respective ring face in a circumferential direction. This further intensifies the disturbance of the superposition of natural frequencies of the lubricant.

In a second main aspect of the second embodiment, which is combinable with the first main aspect of the second embodiment, at least one respective, in particular only one respective of the ring faces of the compressor-side bearing bushing and of the turbine-side bearing bushing may be inclined with respect to a radial plane such that the respective width varies, in particular varies constantly, between a minimum width and a maximum width of the compressor-side outer jacket surface and the turbine-side outer jacket surface, respectively. In particular, both the first ring face and the second ring face of the compressor-side bearing bushing and both the first ring face and the second ring face of the turbine-side bearing bushing may be inclined with respect to a radial plane such that the respective width varies, in particular varies constantly, between a minimum width and a maximum width of the compressor-side outer jacket surface and the turbine-side outer jacket surface, respectively. Additionally, the first ring face of the compressor-side bearing bushing may be inclined in an opposite direction to the second ring face of the compressor-side bearing bushing. Alternatively, the first ring face of the compressor-side bearing bushing may be inclined in the same direction to the second ring face of the compressor-side bearing bushing but by a different amount. Additionally or alternatively, the first ring face of the turbine-side bearing bushing may be inclined in an opposite direction to the second ring face of the turbine-side bearing bushing. Alternatively, the first ring face of the turbine-side bearing bushing may be inclined in the same direction to the second ring face of the turbine-side bearing bushing but by a different amount. Additionally or alternatively, the minimum width may be 55% to 99%, preferably 75% to 95% and most preferably 85% to 90% of the maximum width. Similar, as explained further above with respect to the first main aspect of the second embodiment, the configuration according to the second main aspect of the second embodiment leads to an interruption and/or reduction of the respective outer jacket surface. Thereby, less breaking torque is acting on the respective bearing bushing at the respective position of the minimum width and more breaking torque is acting on the respective bearing bushing at the respective position of the maximum width, which causes a non-uniform bearing load over the circumference, i.e. inner circumference and/or the outer circumference of the respective bearing bushing. In that, the superposition of natural frequencies of the lubricant can be disturbed, i.e. the synchronization effects can be prevented.

In a third main aspect of the second embodiment, which is combinable with any one of previous main aspects of the second embodiment, the compressor-side bearing bushing may comprise a first chamfer and a second chamfer opposing the first chamfer. The turbine-side bearing bushing may comprise a first chamfer and a second chamfer opposing the first chamfer. Additionally, the first chamfer of the compressor-side bearing bushing may face in the same direction as the first chamfer of the turbine-side bearing bushing. Additionally, a width of at least one, in particular one, of the chamfers of the compressor-side bearing bushing and a width of at least one, in particular one, of the chamfers of the turbine-side bearing bushing varies in the circumferential direction. The width of at least one of the chamfers may vary such that also the width of the compressor-side outer jacket surface and the width of the turbine-side outer jacket surface is varied in circumferential direction. Thereby, non-uniform bearing loads over the circumference, i.e. the inner circumference and/or the outer circumference of the bearing bushings can be achieved. In that, the superposition of natural frequencies of the lubricant can be disturbed, i.e. the synchronization effects can be prevented.

In an aspect of the third main aspect of second embodiment, the width of at least one, preferably only one, more preferably both of the chamfers of the compressor-side bearing bushing may vary, in particular may vary constantly, between a minimum width and a maximum width. Additionally or alternatively, the width of at least one, preferably only one, more preferably both of the chamfers of the turbine-side bearing bushing may vary, in particular may vary constantly, between a minimum width and a maximum width. Thereby, the surface width of the respective compressor-side outer jacket surface and the surface width of the turbine-side outer jacket surface is also varied constantly between a minimum width and a maximum width, respectively. Additionally or alternatively, the width of the first chamfer and the width of the second chamfer of the compressor-side bearing bushing may vary in the circumferential direction. Additionally or alternatively, the width of the first chamfer and the width of the second chamfer of the turbine-side bearing bushing may vary in the circumferential direction. Additionally or alternatively, the respective maximum widths of the chamfers of the compressor-side bearing bushing may be arranged at the same circumferential position. Additionally or alternatively, the respective minimum widths of the chamfers of the compressor-side bearing bushing may be arranged at the same circumferential position. Additionally or alternatively, the respective minimum widths and/or the respective maximum widths of the chamfers of the compressor-side bearing bushing may be the same. Additionally or alternatively, the respective maximum widths of the chamfers of the turbine-side bearing bushing may be arranged at the same circumferential position. Additionally or alternatively, the respective minimum widths of the chamfers of the turbine-side bearing bushing may be arranged at the same circumferential position. Additionally or alternatively, the respective minimum widths and/or the respective maximum widths of the chamfers of the turbine-side bearing bushing may be the same.

In another aspect which is combinable with any one of the previous embodiments and aspects, each of the compressor-side bearing bushing and the turbine-side bearing bushing may be a full-floating bushing type.

In another aspect which is combinable with any one of the previous embodiments and aspects, the shaft may rotatably couple a turbine wheel of a turbine to an impeller of a compressor.

In another aspect which is combinable with any one of the previous embodiments and aspects, the bearing assembly may further comprise a spacer. The spacer may be arranged axially between the compressor-side bearing bushing and the turbine-side bearing bushing.

In another aspect which is combinable with any one of the previous embodiments and aspects, the compressor-side bearing bushing may comprise a plurality of lubricant supply bores. Additionally or alternatively, the turbine-side bearing bushing may comprise a plurality of lubricant supply bores.

In another aspect which is combinable with any one of the previous embodiments and aspects, the compressor-side bearing bushing may comprise a circumferential lubricant groove. Additionally or alternatively, the turbine-side bearing bushing may comprise a circumferential lubricant groove.

In another aspect which is combinable with any one of the previous embodiments and aspects, the bearing housing may comprise a first supply groove provided on an inner surface of the bearing bore. Additionally, the bearing housing may comprise a second supply groove provided on the inner surface of the bearing bore.

The present invention further relates to a charging apparatus. The charging apparatus comprises a compressor with a compressor housing and an impeller. The impeller is mounted rotatably in the compressor housing. The charging apparatus further comprises a drive unit which is rotatably coupled to the impeller via a shaft of the charging apparatus. Additionally, the charging apparatus further comprises a bearing assembly of any one of the previous aspects which rotatably supports the shaft. Additionally, the drive unit may comprise a turbine configured to drive the shaft. Additionally or alternatively, the drive unit may comprise an electric motor configured to drive the shaft.

DESCRIPTION OF THE DRAWINGS

FIGS. 4A-4B show detailed sectional views of the bearing assembly according to a third refinement of the first embodiment with different lubricant groove widths;

FIGS. 5A-5B show detailed sectional views of the bearing assembly according to a fourth refinement of the first embodiment with different numbers of lubricant supply bores;

FIGS. 6A-6F show different views of bearing bushings according to a first main aspect of the fifth refinement of the first embodiment including scallops;

FIGS. 8A-8D show different views of bearing bushings according to a third main aspect of the fifth refinement of the first embodiment including chamfers of varying widths;

DETAILED DESCRIPTION

Figure 1:
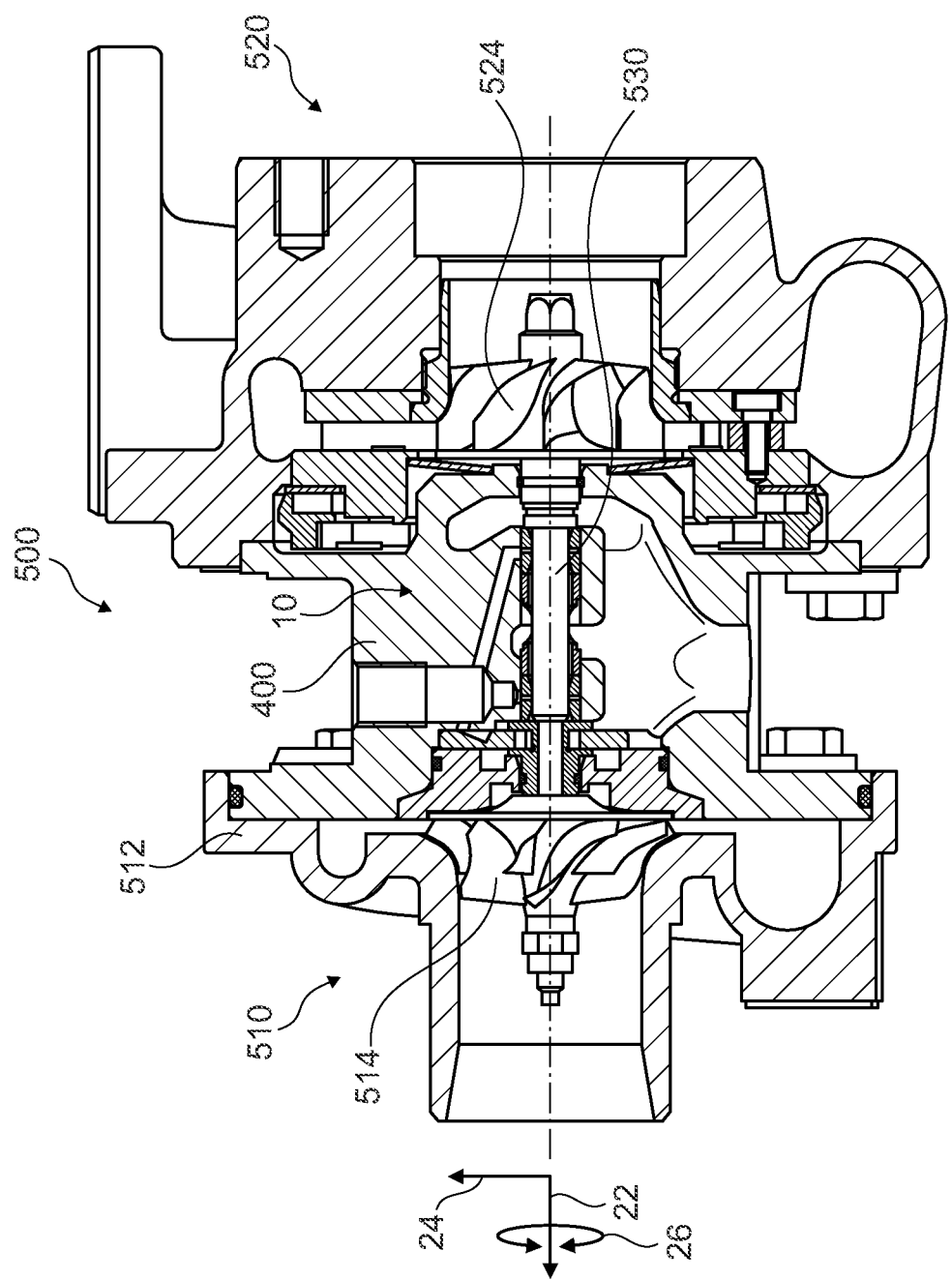
FIG. 1 shows a sectional side view of an exemplary charging apparatus.

In the context of this invention, the expressions axially, axial or axial direction is a direction parallel of or along a rotation axis of the shaft or the bearing bushings which are generally arranged coaxial. Thus, with reference to the figures, see, especially FIGS. 1, 2, 6B and 6C, an axial dimension (axial direction) is described with reference sign 22, a radial dimension (radial direction) extending "radially" away from the axial dimension 22 is described with reference sign 24. Furthermore, a circumferential dimension (circumferential direction) around the axial dimension 22 is described with reference sign 26. A radial plane should be understood as a plane which is spanned by two vectors pointing in different radial directions 22 and which are arranged at the same position in the axial direction 22. Varying "constantly" is to be understood as increasing from a minimum to a maximum or at least remaining the same (in portions) but not decreasing, and decreasing from a maximum to a minimum or at least remaining the same (in portions) but not increasing. Inclination direction is to be understood as rotation of a ring face about an axis which extends along a radial direction 22.

In consistency with the nomenclature further above, the various features and configurations of the present invention is subsequently explained using the expressions embodiments and refinements including their aspects and if applicable main aspects. It is noted that all refinements/main aspects/aspects of one respective embodiment are combinable with any other aspect of other embodiments in order to synergistically enhance the above described advantageous effects. In the following some general features will be described which account for all embodiments including their refinements, main aspects and aspects (i.e. these features account for all aspects). Thereafter each refinement/main aspect will be described separately by means of the respective figure(s) showing the corresponding refinement/main aspect.

FIG. 1 illustrates an exemplary configuration of a charging apparatus 500 including the inventive bearing assembly 10. The charging apparatus 500 comprises a compressor 510 with a compressor housing 512 and an impeller 514 which is mounted rotatably in the compressor housing 512. In the present example, the charging apparatus 500 comprises a turbine 520 as a drive unit. In other configurations, the drive unit may additionally comprise an electric motor or may only consist of an electric motor. The turbine 520 comprises a turbine wheel 524 which is rotatably coupled to the impeller 514 via a shaft 530. The shaft 530 is rotatably supported in a bearing housing 400 via the bearing assembly 10.

In the following, some general aspects of the bearing assembly will be described which may be comprised by any of the presently disclosed bearing assemblies 10. These aspects will be described by means of certain figures and may also be visible only in certain figures, however, these general aspects may concern each of the inventive bearing assemblies. Thereby, it is not meant that each of these general aspects is necessarily essential for each refinement and main aspect.

Figure 2:
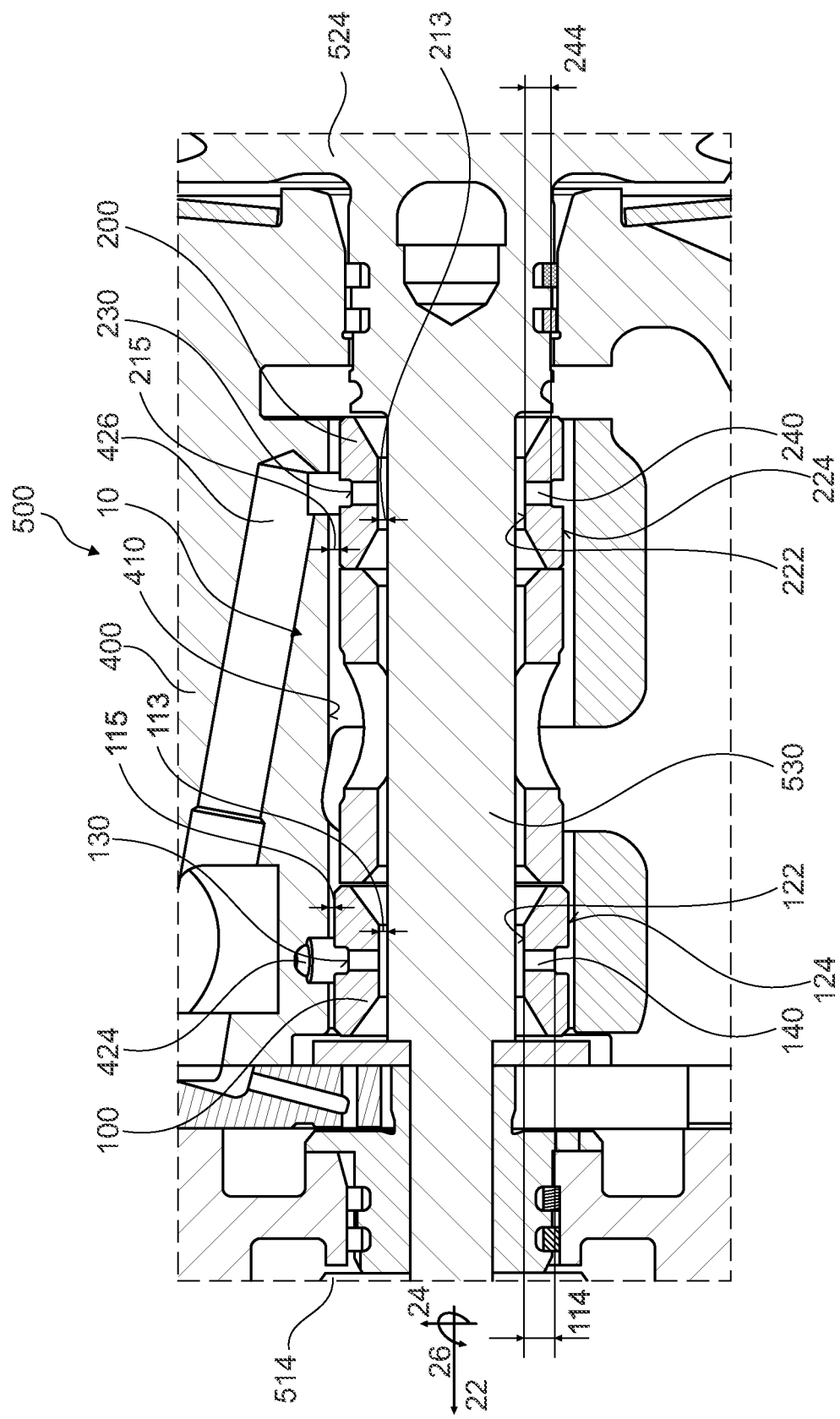
FIG. 2 shows a detailed sectional view of the bearing assembly according to a first refinement of the first embodiment with different outer lubrication gaps.

As illustrated in FIG. 2, the bearing assembly 10 for a charging apparatus 500 comprises the bearing housing 400, the shaft 530, a compressor-side bearing bushing 100 and a turbine-side bearing bushing 200. The bearing assembly 10 is configured as a radial bearing assembly. The compressor-side bearing bushing 100 and the turbine-side bearing bushing 200 together support the shaft 530 inside a bearing bore 410 of the bearing housing 400. In the present example, each of the compressor-side bearing bushing 100 and the turbine-side bearing bushing 200 are a full-floating bushing type. That means, inner lubrication gaps 113, 213 (i.e. radial inner lubrication gaps 113, 213) are provided radially between the bearing bushings 100, 200 and the shaft 520. That means, the lubrication gap 113 between the compressor-side bearing bushing 100 and the shaft 520 is the inner lubrication gap 113 of the compressor-side bearing bushing 100 and is also called compressor-side inner lubrication gap 113. Analogously, the lubrication gap 213 between the turbine-side bearing bushing 200 and the shaft 520 is the inner lubrication gap 213 of the turbine-side bearing bushing 200 and is also called turbine-side inner lubrication gap 213. Furthermore, outer lubrication gaps 115, 215 (i.e. radial outer lubrication gaps 115, 215) are provided radially between the bearing bushings 100, 200 and the bearing housing 400. That means, the lubrication gap 115 between the compressor-side bearing bushing 100 and the bearing housing 400 is the outer lubrication gap 115 of the compressor-side bearing bushing 100 and is also called compressor-side outer lubrication gap 115. Analogously, the lubrication gap 215 between the turbine-side bearing bushing 200 and the bearing housing 400 is the outer lubrication gap 215 of the turbine-side bearing bushing 200 and is also called turbine-side outer lubrication gap 215. Although, not solidly connected, some drive torque may be transmitted from the shaft 530 to the bearing bushings 100, 200 during operation such that the bearing bushings 100, 200 also rotate during operation to a certain extent. Each bearing bushing 100, 200 comprises an inner jacket surface 122, 222 and an outer jacket surface 124, 224. That means the compressor-side bearing bushing 100 comprises an outer jacket surface 124 which is also called a compressor-side outer jacket surface 124. The inner jacket surface 122 of the compressor-side bearing bushing 100 is also called a compressor-side inner jacket surface 122. Analogously, the turbine-side bearing bushing 200 comprises an outer jacket surface 224 which is also called a turbine-side outer jacket surface 224. The inner jacket surface 222 of the turbine-side bearing bushing 200 is also called a turbine-side inner jacket surface 222. More precisely, the respective inner jacket surface 122, 222 is a radially inner jacket surface 122, 222. Between the respective inner jacket surface 122, 222 and the shaft 530, the respective inner lubrication gap 113, 213 is provided. Analogously, the respective outer jacket surface 124, 224 is a radially outer jacket surface 124, 224. Between the respective outer jacket surface 124, 224 and an inner surface 412 of the bearing bore 410, the respective outer lubrication gap 115, 215 is provided. As already mentioned, the shaft 530 rotatably couples the turbine wheel 524 of the turbine 520 to the impeller 514 of the compressor 510.

The bearing assembly 10 further comprises a spacer 300 which is arranged axially between the compressor-side bearing bushing 100 and the turbine-side bearing bushing 200. In the present example, the spacer 300 is configured as a sleeve. However, in other configurations, the spacer 300 may be alternatively configured as any other distance keeping device, e.g. one or more pins, disks or keys or the like, to keep both bearing bushings 100, 200 axially distanced.

Each bearing bushing 100, 200 comprises at least one lubricant supply bore 140, 240. In FIG. 2, the compressor-side bearing bushing 100 and also the turbine-side bearing bushing 200 respectively comprise a plurality of supply bores 140, 240 (although only two are visible, respectively). For instance, in FIGS. 5A and 6C a plurality of lubricant supply bores 140, 240 is visible. The lubricant supply bores 140, 240 extend radially through the respective bearing bushing 100, 200 as is visible, for instance in FIGS. 2 and 8C. The compressor-side bearing bushing 100 and the turbine-side bearing bushing 200 each comprise a circumferential lubricant groove 130, 230 (see, e.g. FIG. 2). The circumferential lubricant groove 130, 230 extends along an outer circumference 114, 214 of the respective bearing bushing 100, 200. Explained in other words, the circumferential lubricant groove 130, 230 is a ring groove arranged on the respective outer jacket surface 124, 224 and extending in the circumferential direction 26. That means, the circumferential lubricant groove 130, 230 is arranged on (i.e. axially recessed in) the respective outer jacket surface 124, 224 of the bearing bushings 100, 200 (see, e.g. FIGS. 2 and 6A). However, in other configurations, no or more than one (for instance, two or three) circumferential lubricant groove 130, 230 may be provided in one or both of the bearing bushings 100, 200 (see, e.g. FIGS. 5A and 5B).

The bearing housing 400 comprises a first supply groove 425 and a second supply groove 427 provided on the inner surface 412 of the bearing bore 410. The lubricant supply grooves 425, 427 extend in the circumferential direction 26. Thus, the lubricant supply grooves 425, 427 are circumferential lubricant supply grooves 425, 427. Thereby, lubricant supply around the circumference can be improved. However, in alternative configurations, the lubricant may be supplied directly to the inner surface 412 of the bearing bore 410 from a respective lubricant supply channel 424, 426 (see, FIGS. 2 and 3A).

FIGS. 6A-6C show that each compressor-side bearing bushing 100 comprises a first ring face 152 and a second ring face 154 opposing the first ring face 152. Also, the turbine-side bearing bushing 200 comprises a first ring face 252 and a second ring face 254 opposing the first ring face 252. The ring faces 152, 252, 154, 254 are generally faced in the axial direction 22. In certain configurations, which will be explicitly described further below, the ring faces 152, 252, 154, 254 may be faced in a direction deviating from a substantially straight axial direction 22. With regard to FIGS. 4A, 7B and 8E it is visible, that the first ring face 152 of the compressor-side bearing bushing 100 faces in the same direction as the first ring face 252 of the turbine-side bearing bushing 200. Furthermore, the second ring face 154 of the compressor-side bearing bushing 100 faces in the same direction as the second ring face 254 of the turbine-side bearing bushing 200. As illustrated in FIGS. 8A-8D, the compressor-side bearing bushing 100 comprises a first chamfer 162 and a second chamfer 164 opposing the first chamfer 162. Also, the turbine-side bearing bushing 200 comprises a first chamfer 262 and a second chamfer 264 opposing the first chamfer 262. The first chamfer 162 of the compressor-side bearing bushing 100 faces in approximately the same direction as the first chamfer 262 of the turbine-side bearing bushing 200. Analogously, the second chamfer 164 of the compressor-side bearing bushing 100 faces in approximately the same direction as the second chamfer 264 of the turbine-side bearing bushing 200. The chamfers 162, 262, 164, 264 are thereby extending in the circumferential direction 26 on outer edges of the respective bearing bushing 100, 200. More specifically, the chamfers 162, 262, 164, 264 are extending along edges at the outer circumference 114, 214 of the respective bearing bushing 100, 200.

FIGS. 2, 3A-3B, 4A-4B, 5A-5B, 6A-6F, 7A, 8A-8D show different configurations of a first embodiment of the inventive bearing assembly 10 for a charging apparatus 500. In the bearing assembly 10 of this first embodiment, the compressor-side bearing bushing 100 is configured differently than the turbine-side bearing bushing 200. The main effect which can be achieved by configuring the compressor-side bearing bushing 100 differently than the turbine-side bearing bushing 200 is that both bearing bushings 100, 200 eventually rotate at different speeds during operation. In other words, this means that the compressor-side bearing bushing 100 rotates at a different speed than the turbine-side bearing bushing 200. This leads to the advantage that synchronization effects of lubricant film vibrations can be prevented. By disturbing the superposition of natural frequencies of the lubricant, i.e. by disturbing synchronization effects, the acoustic and vibration transfer into the periphery can be limited, and thus, an improved NVH behavior can be achieved. Different rotation speeds of the bearing bushings 100, 200 can be achieved by various inventive measures which are described in the following. These measures are mainly based on one or more of the following principles: variation of the lubricant film temperature, variation of the breaking torque and variation of the bearing load over the circumference to prevent synchronization of the bearing bushings 100, 200.

In the first refinement which is depicted in FIG. 2, the compressor-side outer lubrication gap 115 is smaller than the turbine-side outer lubrication gap 215. For illustrative purposes the dimensions of the inner and outer lubrication gaps 113, 213, 115, 215 are depicted enlarged. However, it is to be understood that this is only a schematic illustration and that the inner and outer lubrication gaps 113, 213, 115, 215 are smaller in reality and, especially, that the compressor-side outer lubrication gap 115 is smaller than the turbine-side outer lubrication gap 215. Thereby, different amounts of lubricant are present at the bearing bushings 100, 200, i.e. less lubricant is present in the compressor-side outer lubrication gap 115 than in the turbine-side outer lubrication gap 215. This leads to a larger breaking torque on the compressor-side bearing bushing 100 than on the turbine-side bearing bushing 200 due to higher shear forces in the lubricant film (in the compressor-side outer lubrication gap 115). Due to the larger breaking torque at the compressor-side bearing bushing 100 (more precisely in the compressor-side outer lubrication gap 115) than at the turbine-side bearing bushing 200 (more precisely in the turbine-side outer lubrication gap 215), the compressor-side bearing bushing 100 rotates slower during operation of the bearing assembly 10 than the turbine-side bearing bushing 200. In that, the superposition of natural frequencies of the lubricant can be disturbed, i.e. synchronization effects can be prevented. Thereby, it is particularly advantageous that the turbine-side outer lubrication gap 215 is configured larger compared to the standard configuration of the turbine-side outer lubrication gap 215 as this leads in a synergetic way to an improved cooling effect on the turbine-side bearing bushing. The compressor-side inner lubrication gap 113 is equally sized as the turbine-side inner lubrication gap 213. Thereby, tilting of the shaft 530 is prevented or at least reduced which consequently leads to an improved motion and stabilization of the shaft 530 whilst still preventing synchronization effects.

Figure 3A:
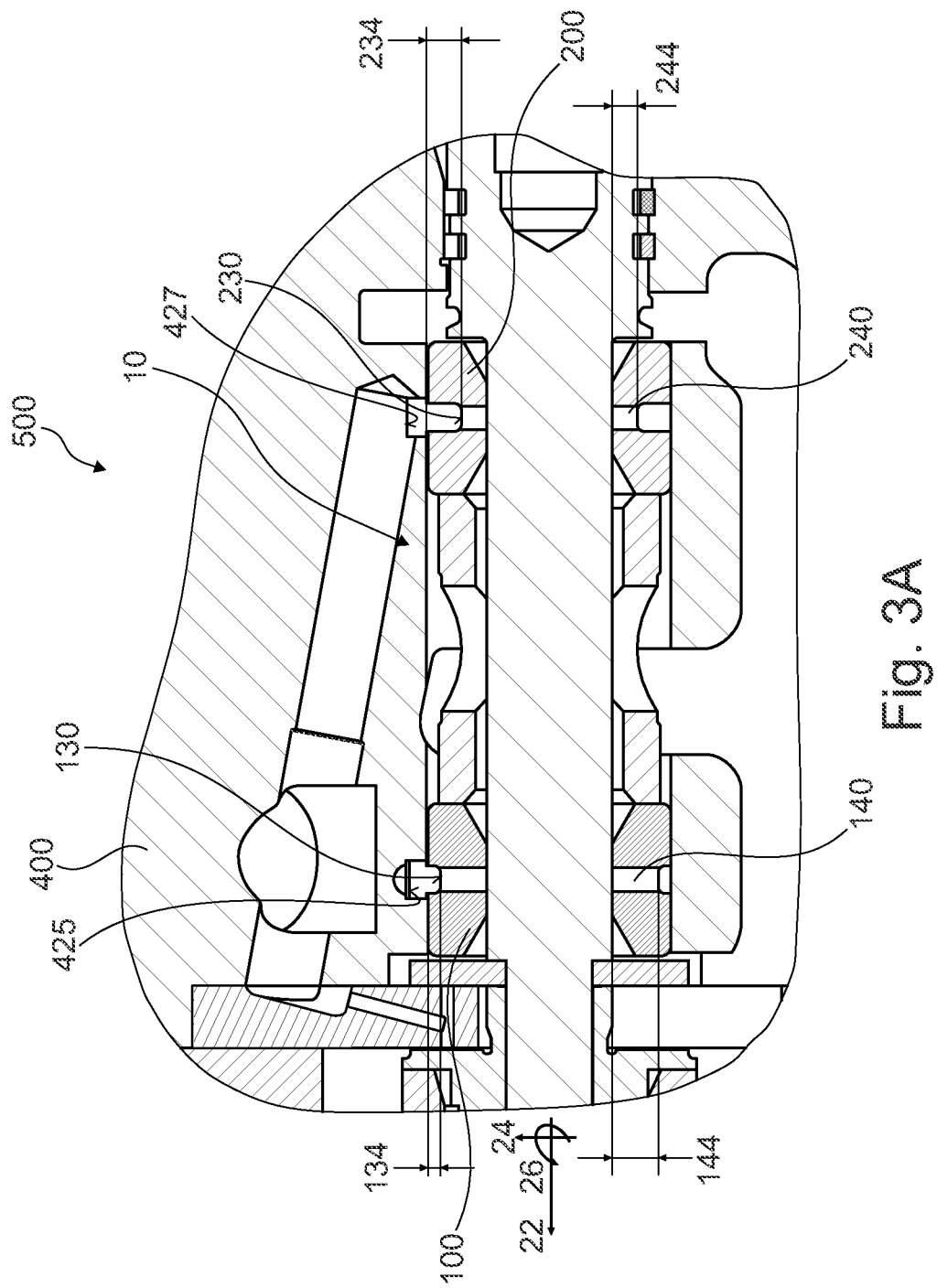
FIGS. 3A-3B show detailed sectional views of the bearing assembly according to a second refinement of the first embodiment with different lubricant groove depths.
Figure 3B:
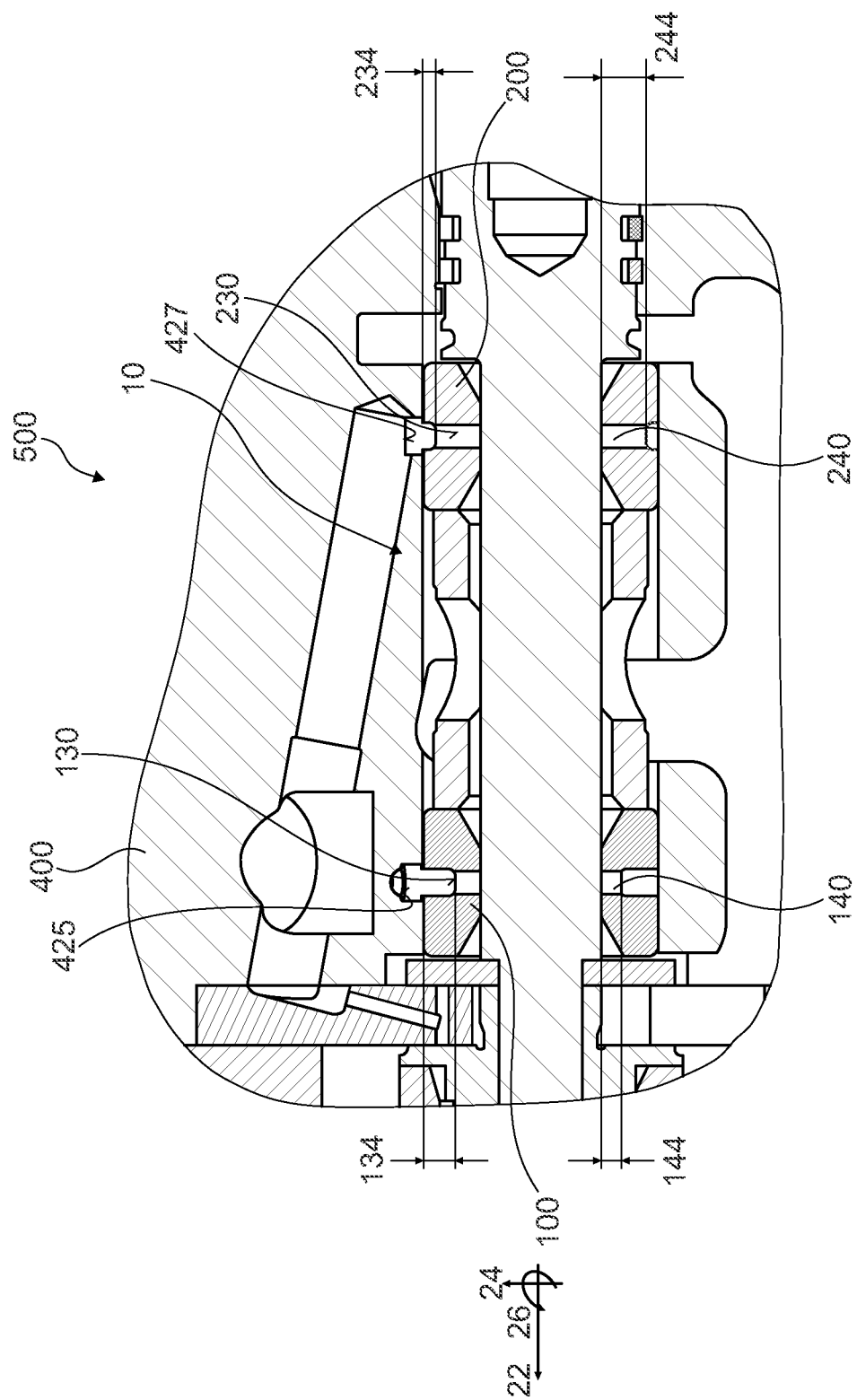

In the second refinement which is depicted in FIGS. 3A-3B, a depth 134 of the compressor-side circumferential lubricant groove 130 is configured differently than a depth 234 of the turbine-side circumferential lubricant groove 230. The respective depth 134, 234 is thereby to be understood as a length/dimension in the radial direction 24. The different depths 134, 234 of the circumferential lubricant grooves 130, 230 affect the lubricant supply bores 140, 240 of the bearing bushings 100, 200 such that respective bore depths 144 of the lubricant supply bores 140 are different on the compressor-side bearing bushing 100 from respective bore depths 244 of the lubricant supply bores 240 on the turbine-side bearing bushing 200. This leads to different lever arms of the lubricant inside the lubricant supply bores 140, 240 and thereby to different centrifugal forces and counter pressures in the lubricant supply bores 140, 240 of the compressor-side bearing bushing 100 and of the turbine-side bearing bushing 200, respectively. This on the other hand affects lubricant throughput from the outer lubrication gaps 115, 215 towards the inner lubrication gaps 113, 213. Thereby, a smaller depth 134, 234 of the circumferential lubricant groove 130, 230 leads to a larger bore depth 144, 244 of the lubricant supply bore 140, 240 and therefore, to a higher centrifugal force and counter pressure. This effectuates a smaller lubricant throughput to the inner lubrication gap 113, 213 and thereby leads to higher lubricant temperatures in the inner lubrication gap 113, 213. Having a higher lubricant temperature leads to a lower viscosity of the lubricant in the inner lubrication gap 113, 213. As a consequence, the transmission of drive torque between the shaft 530 and the respective bearing bushing 100, 200 is reduced and therefore the respective bearing bushing 100, 200 rotates slower during operation. Analogously, when the shaft is decelerated, the respective bearing bushing 100, 200 is decelerated faster than the other bearing bushing 100, 200 which has a smaller depth 134, 234 of the circumferential lubricant groove 130, 230. Thereby, it is achieved that the rotational speeds of the bearing bushings 100, 200 differ in all (or at least in a majority) of possible operating conditions. In that, the superposition of natural frequencies of the lubricant can be disturbed, i.e. the synchronization effects can be prevented.

FIG. 3A shows a first configuration of the second refinement, wherein the depth 134 of the compressor-side circumferential lubricant groove 130 is smaller than the depth 234 of the turbine-side circumferential lubricant groove 230. This is particularly advantageous as at the turbine-side which is anyway warmer and has higher mass, further heat increase should be prevented. Analogously to the explanations further above, more lubricant is supplied to the turbine-side bearing bushing 200 which results in a faster rotation of the turbine-side bearing bushing 200 during operation due to a reduced lubricant film temperature in the inner lubrication gap 213 of the turbine-side bearing bushing 200 compared to the compressor-side bearing bushing 100. Consequently, this leads in a synergetic way to an improved cooling effect on the turbine-side bearing bushing 200. In this exemplary configuration, the depth 134 of the compressor-side circumferential lubricant groove 130 is approximately 60% smaller than the depth 234 of the turbine-side circumferential lubricant groove 230. However, in other configurations, the depth 134 of the compressor-side circumferential lubricant groove 130 may be 5% to 90%, preferably 15% to 80% and most preferably 25% to 50% smaller than the depth 234 of the turbine-side circumferential lubricant groove 230.

In a different configuration of the second refinement according to FIG. 3B, the depth 234 of the turbine-side circumferential lubricant groove 230 is smaller than the depth 134 of the compressor-side circumferential lubricant groove 130. Thereby, the lubricant throughput is reduced at the turbine-side bearing bushing 200 which leads to decreased drive torque transmission between the shaft 530 and the turbine-side bearing bushing 200 due to a higher lubricant film temperature in the inner lubrication gap 213 of the turbine-side bearing bushing 200 compared to the compressor-side bearing bushing 100. In this exemplary configuration, the depth 234 of the turbine-side circumferential lubricant groove 230 is approximately 60% smaller than the depth 134 of the compressor-side circumferential lubricant groove 130. However, in other configurations, the depth 234 of the turbine-side circumferential lubricant groove 230 may be 5% to 90%, preferably 15% to 80% and most preferably 25% to 50% smaller than the depth 134 of the compressor-side circumferential lubricant groove 130.

In alternative configurations (not shown in the figures), the number of circumferential lubricant grooves 230 may be different on the turbine-side from the number of circumferential lubricant grooves 130 on the compressor-side to achieve a similar effect. For instance one of the bearing bushings 100, 200 may comprise one circumferential lubricant groove 130, 230 and the other bearing bushing 100, 200 may comprise two or three circumferential lubricant grooves 130, 230. It would also be possible to not provide any circumferential lubricant groove 130, 230 on one of the bearing bushings 100, 200 and one, two or three circumferential lubricant grooves 130, 230 on the other bearing bushing 100, 200.

Figure 4A:
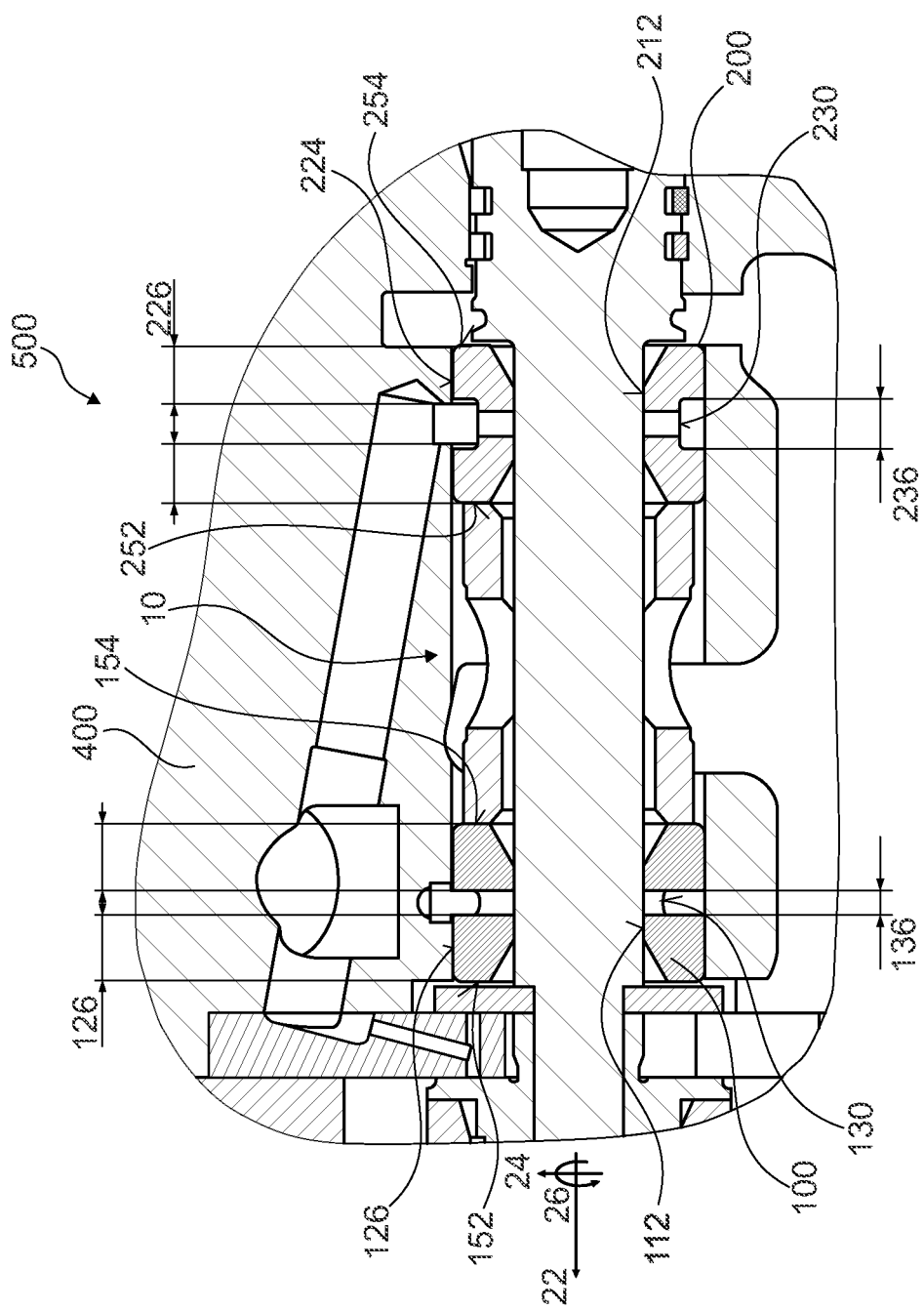

In the third refinement which is depicted in FIGS. 4A-4B, a width 136 of the compressor-side circumferential lubricant groove 130 is configured differently than a width 236 of the turbine-side circumferential lubricant groove 230. The respective width 136, 236 is thereby to be understood as a length/dimension in the axial direction 22. The different widths 136, 236 of the circumferential lubricant grooves 130, 230 affect the outer jacket surfaces 124, 224 of the bearing bushings 100, 200 such that respective widths 126, 226 of the outer jacket surfaces 124, 224 are different on the compressor-side bearing bushing 100 and the turbine-side bearing bushing 200. In this context, the width 126, 226 of the respective outer jacket surface 124, 224 is to be understood as a length/dimension in the axial direction 22 deducted by the respective width 136, 236 of the circumferential lubricant grooves 130, 230.

That means, the width 126, 226 of the outer jacket surface 124, 224 is the sum of the length of the two double arrows indicated at 126 and 226 in FIG. 4A, respectively. To further clarify this issue, for instance, the width 126 of the compressor-side outer jacket surface 124 is sum of the axial dimension of the compressor-side outer jacket surface 124 to the left of the circumferential lubricant groove 130 and the axial dimension of the compressor-side outer jacket surface 124 to the right of the circumferential lubricant groove 130 in FIG. 4A. This analogously accounts for the width 226 of the turbine-side outer jacket surface 224. Having different widths 126, 226 on the outer jacket surfaces 124, 224, i.e. having different effective outer bearing surfaces leads to different resulting breaking torques from the frictional shear forces in the lubricant film. The different breaking torques cause the bearing bushings 100, 200 to rotate at different speeds. In that, the superposition of natural frequencies of the lubricant can be disturbed, i.e. the synchronization effects can be prevented.

FIG. 4A shows a first configuration of the third refinement, wherein the width 136 of the compressor-side circumferential lubricant groove 130 is smaller than the width 236 of the turbine-side circumferential lubricant groove 230. Thereby, more braking torque is acting on the compressor-side bearing bushing 100 compared to the turbine-side bearing bushing 200. Consequently, the compressor-side bearing bushing 100 rotates slower than the turbine-side bearing bushing 200 during operation. This is particularly advantageous as less braking torque leads to less heat development due to friction. Consequently, this leads in a synergetic way to an improved cooling effect on the turbine-side bearing bushing 200. In this exemplary configuration, the width 136 of the compressor-side circumferential lubricant groove 130 is approximately 60% smaller than the width 236 of the turbine-side circumferential lubricant groove 230. However, in other configurations, the width 136 of the compressor-side circumferential lubricant groove 130 may be 5% to 50%, preferably 10% to 40% and most preferably 15% to 25% smaller than the width 236 of the turbine-side circumferential lubricant groove 230.

In a different configuration of the third refinement according to FIG. 4B, the width 236 of the turbine-side circumferential lubricant groove 230 is smaller than the width 136 of the compressor-side circumferential lubricant groove 130. Thereby, more braking torque is acting on the turbine-side bearing bushing 200 compared to the compressor-side bearing bushing 100. Consequently, the turbine-side bearing bushing 200 rotates slower than the compressor-side bearing bushing 100 during operation. In this exemplary configuration, the width 236 of the turbine-side circumferential lubricant groove 230 is approximately 60% smaller than the width 136 of the compressor-side circumferential lubricant groove 130. However, in other configurations, the width 236 of the turbine-side circumferential lubricant groove 230 may be 5% to 50%, preferably 10% to 40% and most preferably 15% to 25% smaller than the width 136 of the compressor-side circumferential lubricant groove 130.

In alternative configurations (not shown in the figures), the number of circumferential lubricant grooves 230 may be different on the turbine-side from the number of circumferential lubricant grooves 130 on the compressor-side to achieve a similar effect. For instance one of the bearing bushings 100, 200 may comprise one circumferential lubricant groove 130, 230 and the other bearing bushing 100, 200 may comprise two or three circumferential lubricant grooves 130, 230. It would also be possible to not provide any circumferential lubricant groove 130, 230 on one of the bearing bushings 100, 200 and one, two or three circumferential lubricant grooves 130, 230 on the other bearing bushing 100, 200.

Figure 5B:
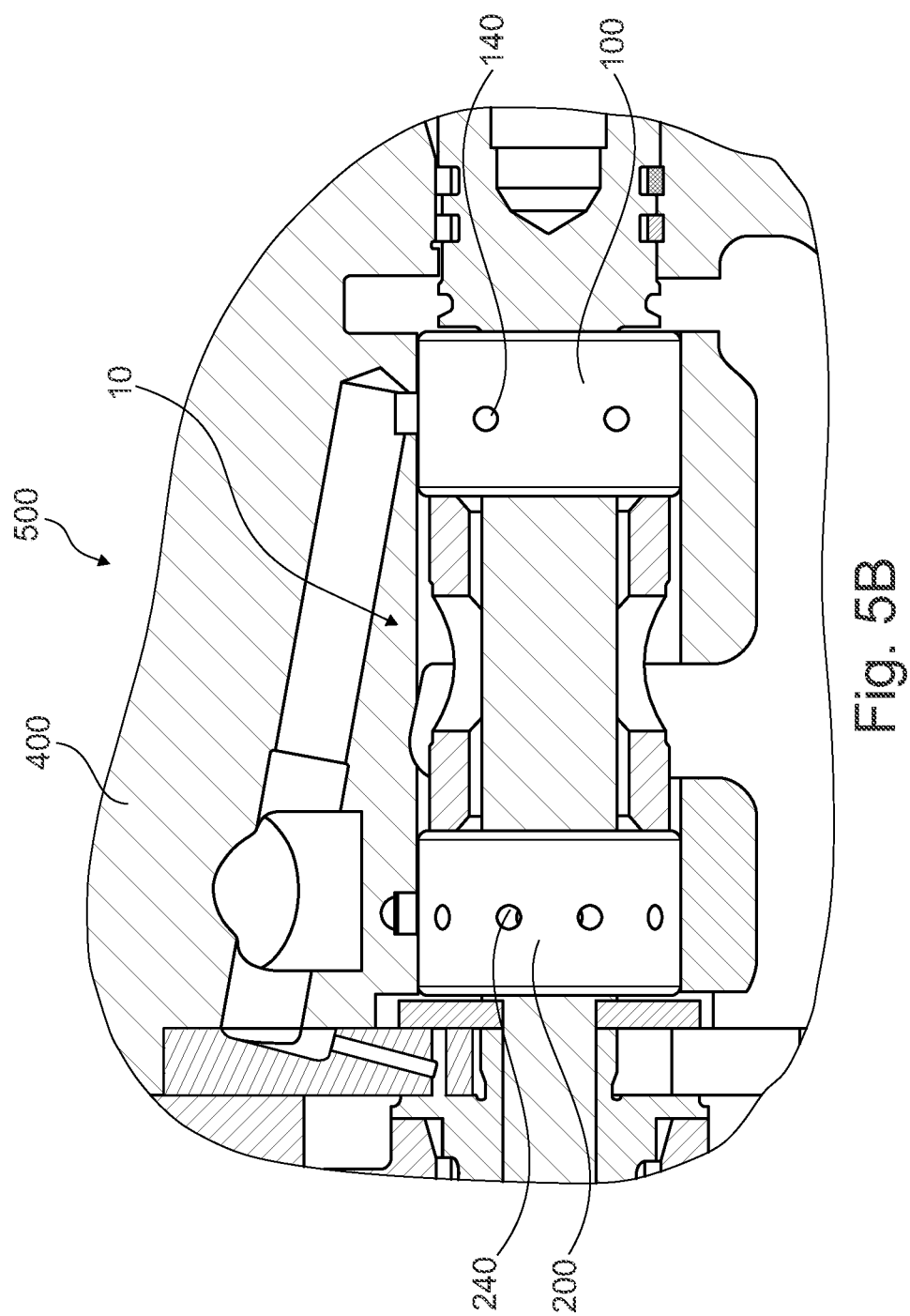

In the fourth refinement which is depicted in FIGS. 5A-5B, a number of lubricant supply bores 140 of the compressor-side bearing bushing 100 is different than a number lubricant supply bores 240 of the turbine-side bearing bushing 200. In this regard, FIG. 5A shows an example configuration, wherein the compressor-side bearing bushing 100 comprises six lubricant supply bores 140 (although only two are visible) and wherein the turbine-side bearing bushing 200 comprises ten lubricant supply bores 240 (although only four are visible). On the other hand, FIG. 5B shows another example configuration, wherein the compressor-side bearing bushing 100 comprises ten lubricant supply bores 140 (although only four are visible) and wherein the turbine-side bearing bushing 200 comprises six lubricant supply bores 240 (although only two are visible). These numbers should merely represent example configurations. In any possible example, each bearing bushing 100, 200 at least comprises one lubricant supply bores 140, 240 and one of the bearing bushings 100, 200 comprises at least one lubricant supply bore 140, 240 more or less than the other bearing bushing 100, 200. In other configurations, one of the bearing bushings 100, 200 may, for instance, comprise four and the other bearing bushing 100, 200 may comprise six lubricant supply bores 140, 240. In further configurations, one of the bearing bushings 100, 200 may, for instance, comprise at least one, exactly one, two, three, four or five lubricant supply bores 140, 240 less than the other bearing bushing 100, 200. In further configurations, one of the bearing bushings 100, 200 may, for instance, comprise five and the other bearing bushing 100, 200 may comprise six lubricant supply bores 140, 240. In further configurations, one of the bearing bushings 100, 200 may, for instance, comprise five and the other bearing bushing 100, 200 may comprise ten lubricant supply bores 140, 240. In further configurations, one of the bearing bushings 100, 200 may, for instance, comprise four and the other bearing bushing 100, 200 may comprise eight lubricant supply bores 140, 240. In further configurations, one of the bearing bushings 100, 200 may, for instance, comprise two and the other bearing bushing 100, 200 may comprise four, five six or ten lubricant supply bores 140, 240. By the provision of different numbers of lubricant supply bores 140, 240 on the compressor-side bearing bushing 100, and on the turbine-side bearing bushing 200 a different lubricant throughput is achieved on the turbine-side than on the compressor-side. This results in different throttle effects from the outer circumference 114, 214 of the respective bearing bushing 100, 200 to the inner circumference 112, 212 of the respective bearing bushing 100, 200 and thereby leads to different amounts of lubricant in the inner lubrication gaps 113, 213. Consequently, different lubricant film temperatures and viscosities are built up in the inner lubrication gaps 113, 213 and thereby the transmission of drive torque between the shaft 530 and the bearing bushings 100, 200 is different which causes the bearing bushings 100, 200 to rotate at different speeds. In that, the superposition of natural frequencies of the lubricant can be disturbed, i.e. the synchronization effects can be prevented.

FIGS. 6A-6F, 7A and 8A-8D show exemplary configurations of bearing bushings 100, 200 according to the fifth refinement of the bearing assembly 10. All configurations of this fifth refinement have in common that one of the compressor-side outer jacket surface 124 or the turbine-side outer jacket surface 224 varies in width 126, 226 along the outer circumference 114, 124. That means a profile of the width 126 of the compressor-side outer jacket surface 124 is different from a profile of the width 226 of the turbine-side outer jacket surface 224. That means respective radially outer bearing surfaces (i.e. the outer jacket surfaces 124, 224) of the bearing bushings 100, 200 are unequally sized on the compressor-side bearing bushing 100 and on the turbine-side bearing bushing 200. This leads to different breaking torques at the bearing bushings 100, 200 due to friction. The different breaking torques, cause the bearing bushings 100, 200 to rotate at different speeds. In that, the superposition of natural frequencies of the lubricant can be disturbed, i.e. the synchronization effects can be prevented. Further details regarding the fifth refinement, will be generally described referring to a bearing bushing 100, 200, which can be one of the compressor-side bearing bushing 100 or the turbine-side bearing bushing 200. However, it is to be understood that only one of the compressor-side bearing bushing 100 or the turbine-side bearing bushing 200 is correspondingly configured according to the fifth refinement whilst the other bearing bushing 100, 200 does not comprise the specific features described further below.

A first main aspect of the fifth refinement is shown in FIGS. 6A-6F, which, for illustrative purposes merely depict one example bearing bushing 100, 200, as these configurations mainly concern features of the bearing bushing 100, 200 whilst the other features of the bearing assembly 10 may be configured according to any configuration as already explained further above. As shown in the FIGS. 6A-6F, one of the bearing bushings 100, 200 comprises at least one scallop 156, 156a, 156b, 256, 156a, 256b on at least one of the ring faces 152, 154, 252, 254. In a first configuration according to FIGS. 6A-6F, the depicted example bearing bushing 100, 200 comprises six scallops 156, 256 on each of the ring faces 152, 154, 252, 254. In other configurations (not shown) less or more than six, in particular only one, two or four scallops 156, 156a, 156b, 256, 156a, 256b may be provided on only one or both of the ring faces 152, 154, of the compressor-side bearing bushing 100, or on only one or both of the ring faces 252, 254 of the turbine-side bearing bushing 200. Also the number of scallops on the first ring face 152, 252 may vary from the number of scallops on the second ring face 154, 254 (not shown). For instance, one of the first ring face 152, 252 or the second ring face 154, 254 may comprise one scallop 156, 156a, 156b, 256, 156a, 256b and the other of the first ring face 152, 252 or the second ring face 154, 254 may comprise two, three, four or more than four scallops 156, 156a, 156b, 256, 156a, 256b. In another configuration, one of the first ring face 152, 252 or the second ring face 154, 254 may comprise two scallops 156, 156a, 156b, 256, 156a, 256b and the other of the first ring face 152, 252 or the second ring face 154, 254 may comprise three, four or more than four scallops 156, 156a, 156b, 256, 156a, 256b (and so on). By the provision of at least one scallop 156, 156a, 156b, 256, 156a, 256b the advantageous effect of interfering with the respective outer jacket surface 124, 224 and thereby the provision of a reduced breaking torque compared to a bearing bushing 100, 200 not comprising any scallop 156, 156a, 156b, 256, 156a, 256b can be achieved. Generally, a scallop 156, 156a, 156b, 256, 156a, 256b is to be understood as a recess in one of the ring faces 152, 154, 252, 254 which interferes with, in particular which reduces the width 126, 226 the total surface area of the outer jacket surface 124, 224. In the shown examples, the scallop 156, 156a, 156b, 256, 156a, 256b extends along a circular segment on the ring face 152, 154, 252, 254 in the circumferential direction 26 and from the respective outer circumference 114, 214 to or towards the respective inner circumference 112, 212. A scallop 156, 156a, 156b, 256, 156a, 256b can be produced, for instance by drilling along the ring face 152, 154, 252, 254 in the radial direction 24. In detail, the scallop 156, 156a, 156b, 256, 156a, 256b reduces the respective outer jacket surface 124, 224.

Figure 6F:
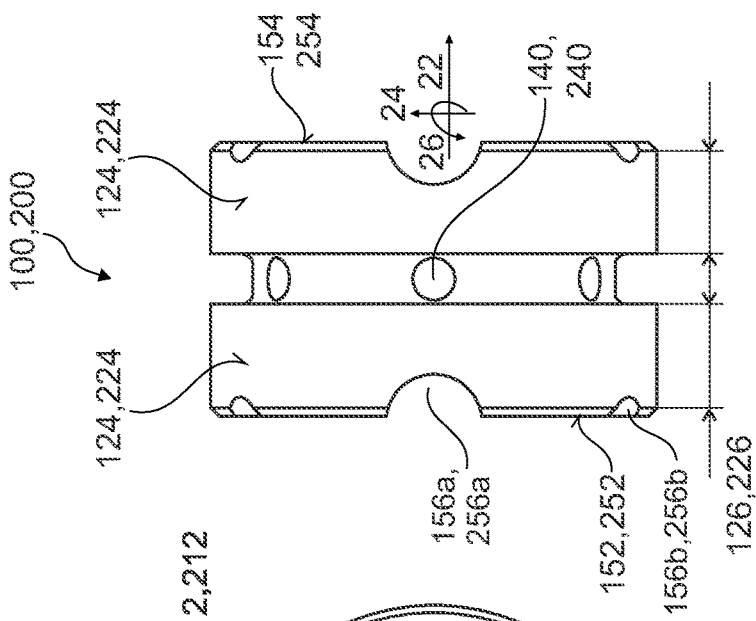
Figure 6E:
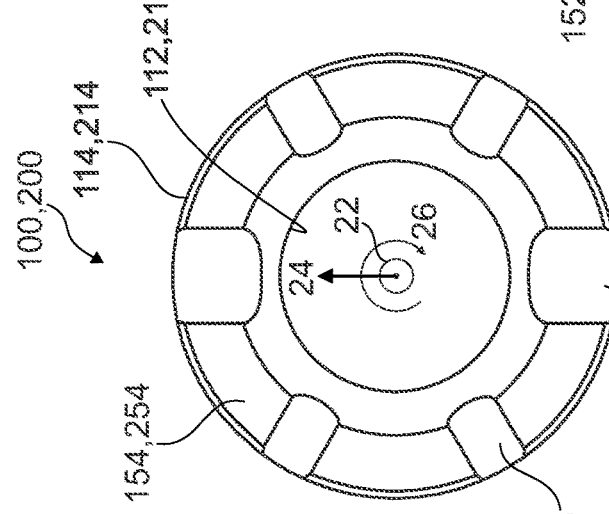
Figure 6D:
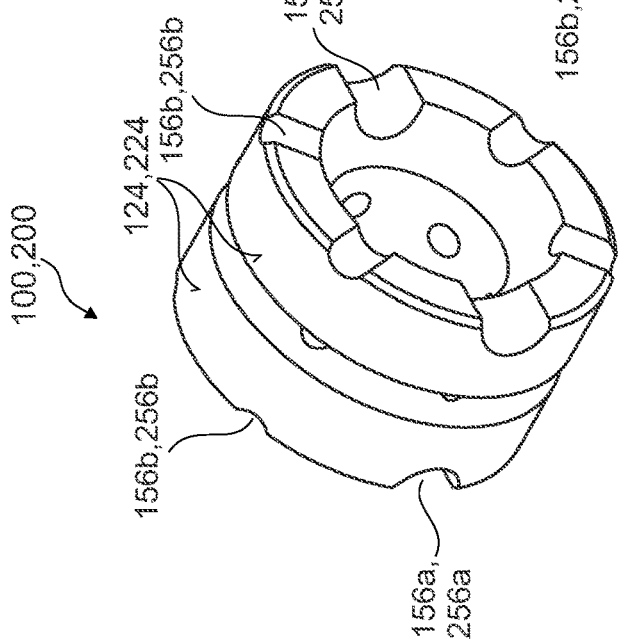

By reducing the respective outer jacket surface 124, 224, less breaking torque is acting on the respective bearing bushing 100, 200, which causes that bearing bushing 100, 200 including the scallop 156, 156a, 156b, 256, 156a, 256b to rotate at a higher speed than the other bearing bushing 100, 200 which does not comprise scallops 156, 156a, 156b, 256, 156a. Furthermore, by the provision of the scallop (or scallops) 156, 156a, 156b, 256, 156a, 256b a non-uniform bearing load can be provided over the outer circumference 114, 214 of the bearing bushing 100, 200 which comprises the scallop (or scallops) 156, 156a, 156b, 256, 156a, 256b by partly interrupting the outer jacket surface 124, 224 in a region of the circular segment in which the scallop 156, 156a, 156b, 256, 156a, 256b is arranged. In that, the superposition of natural frequencies of the lubricant can be disturbed, i.e. the synchronization effects can be prevented. Having more than one scallop 156, 156a, 156b, 256, 156a, 256b further reduces the total surface area of the outer jacket surface 124, 224. Thereby, the advantageous effects of disturbing the natural frequencies of the lubricant and the difference of rotation speeds of the bearing bushings 100, 200 can be intensified. The scallops 156, 156a, 156b, 256, 156a, 256b distributed equally spaced on the respective ring face 152, 154, 252, 254 in a circumferential direction 26 in the example configurations of FIGS. 6A-6F. In alternative configurations, the scallops may also be distributed unequally spaced on the respective ring face 152, 154, 252, 254 in a circumferential direction 26 (not shown). In the example configurations of FIGS. 6A-6F, the circumferential positions of the scallops 156, 156a, 156b, 256, 156a, 256b on the first ring face 152, 252 are equal to the circumferential positions of the scallops 156, 156a, 156b, 256, 156a, 256b on the second ring face 154, 254. In alternative configurations, the scallops 156, 156a, 156b, 256, 156a, 256b may also be arranged at different circumferential positions on the first ring face 152, 252 and on the second ring face 154, 254. In FIGS. 6A-6C, all scallops 156, 256 are configured having the same size and dimension. In alternative configurations one or more scallops 156a, 256a may be configured differently, in particular with respect to size and dimension than other scallops 156b, 256b (see, FIGS. 6D-6F). In the latter figures, four scallops 156a, 256a of a first type (i.e. a first size/dimension) and two scallops 156b, 256b of a second type (i.e. a second size/dimension) are provided on the respective ring face 152, 252, 154, 254. Thereby, the scallops 156b, 256b of the second type are configured larger than the scallops 156a, 256a of the first type. This further intensifies the disturbance of the superposition of natural frequencies of the lubricant and the difference of rotation speeds of the bearing bushings 100, 200.

Figure 7A:
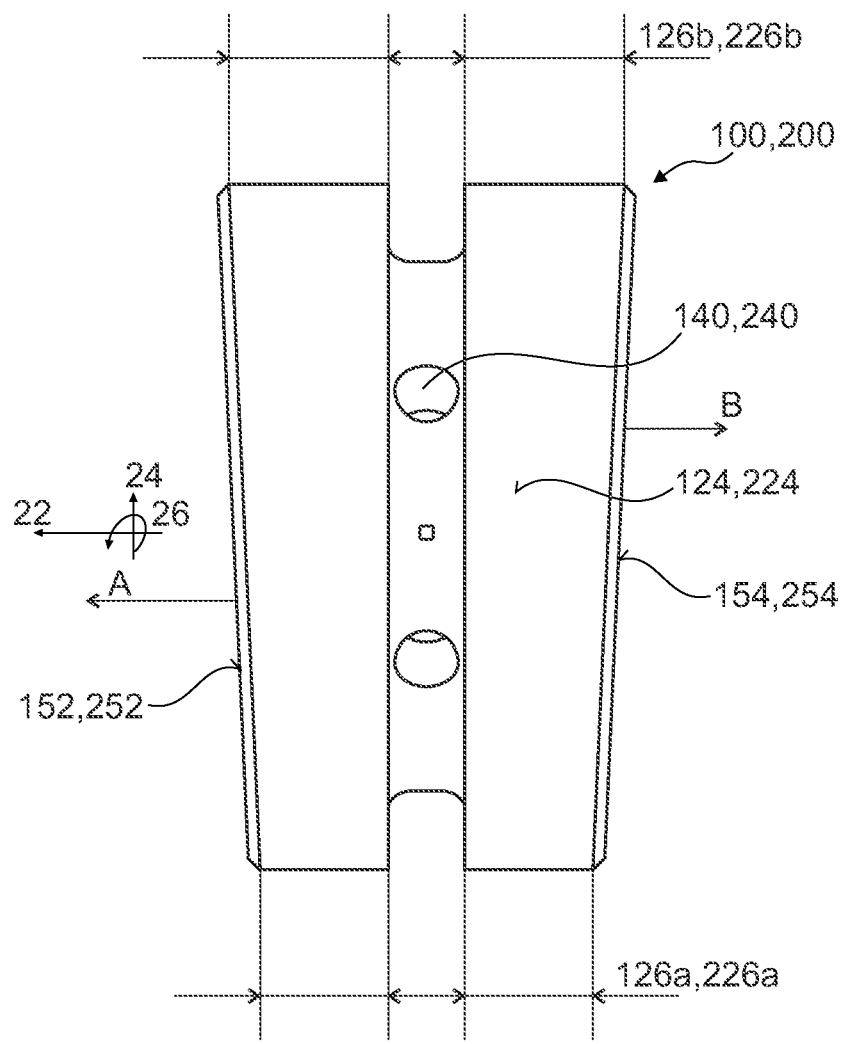
FIG. 7A shows a front view of a bearing bushing according to a second main aspect of the fifth refinement with inclined ring faces.

A second main aspect of the fifth refinement is shown in FIG. 7A, which, for illustrative purposes merely depicts one example bearing bushing 100, 200, as these configurations mainly concern features of the bearing bushing 100, 200 whilst the other features of the bearing assembly 10 may be configured according to any configuration as already explained further above. According to this second main aspect of the fifth refinement, at least one of the ring faces 152, 154 of the compressor-side bearing bushing 100 or at least one of the ring faces 252, 254 of the turbine-side bearing bushing 200 is inclined with respect to a radial plane. In that, the respective width 126, 226 varies constantly between a minimum width 126a, 226a and a maximum width 126b, 226b of the compressor-side outer jacket surface 124 or the turbine-side outer jacket surface 224, respectively. That means, the width 126, 226 of the respective outer jacket surface 124, 224 and thereby also the total surface area of the respective outer jacket surface 124, 224 can be reduced. By reducing the respective outer jacket surface 124, 224, less breaking torque is acting on the respective bearing bushing 100, 200, which causes that bearing bushing 100, 200 which includes an inclined ring face 152, 252, 154, 254 to rotate at a higher speed than the other bearing bushing 100, 200. Furthermore, by the varying width 126, 226 of the outer jacket surface 124, 224 in the circumferential direction, a non-uniform bearing load can be provided over the outer circumference 114, 214 of the bearing bushing 100, 200 which comprises an inclined ring face 152, 252, 154, 254. In that, the superposition of natural frequencies of the lubricant can be disturbed, i.e. the synchronization effects can be prevented. In the example configuration of FIG. 7A, both, the first ring face 152, 252 and the second ring face 154, 254 of the bearing bushing 100, 200 are inclined with respect to a radial plane. However, it is to be understood that in alternative configurations (not shown), only one of the ring faces 152, 154 of the compressor-side bearing bushing 100 or only one of the ring faces 252, 254 of the turbine-side bearing bushing 200 may be inclined with respect to a radial plane. Furthermore, the example configuration shows that the respective first ring face 152, 252 is inclined in an opposite direction to the respective second ring face 154, 254. In alternative configurations (not shown), the respective first ring face 152, 252 may be inclined in the same direction as the respective second ring face 154, 254. Thereby, the first ring face 152, 252 may be inclined by the same amount (i.e. angle/degree with respect to the radial plane or to the axial direction 22) or by a different amount than the second ring face 154, 254. In the case that the first and the second ring faces 152, 252, 154, 254 are inclined in the same direction and by the same amount, the width 126, 226 of the outer jacket surface 124, 224 obviously does not vary between a minimum and a maximum but is rather constant. However, also in this case the advantageous effects are achieved. That is because the inclined ring faces 152, 252, 154, 254 are usually produced by removing material from a standard bearing bushing 100, 200 such that the width 126, 226 of the bearing bushing 100, 200 comprising the inclined ring faces 152, 252, 154, 254 is still smaller and thereby that bearing bushing 100, 200 rotates faster during operation than the other bearing bushing 100, 200 which comprises the surface area of the standard outer jacket surface 124, 224. Being inclined in the same direction and by the same amount means that a vector A along which the first ring face 152, 252 is faced is parallel to the vector B along which the second ring face 154, 254 is faced. In the example configuration of FIG. 7A, however, the vectors A and B are not parallel. In this exemplary configuration, the minimum width 126a, 226a is approximately 70% of the maximum width 126b, 226b. However, in other configurations, the minimum width 126a, 226a may be 55% to 99%, preferably 75% to 95% and most preferably 85% to 90% of the maximum width 126b, 226b.

Figure 8D:
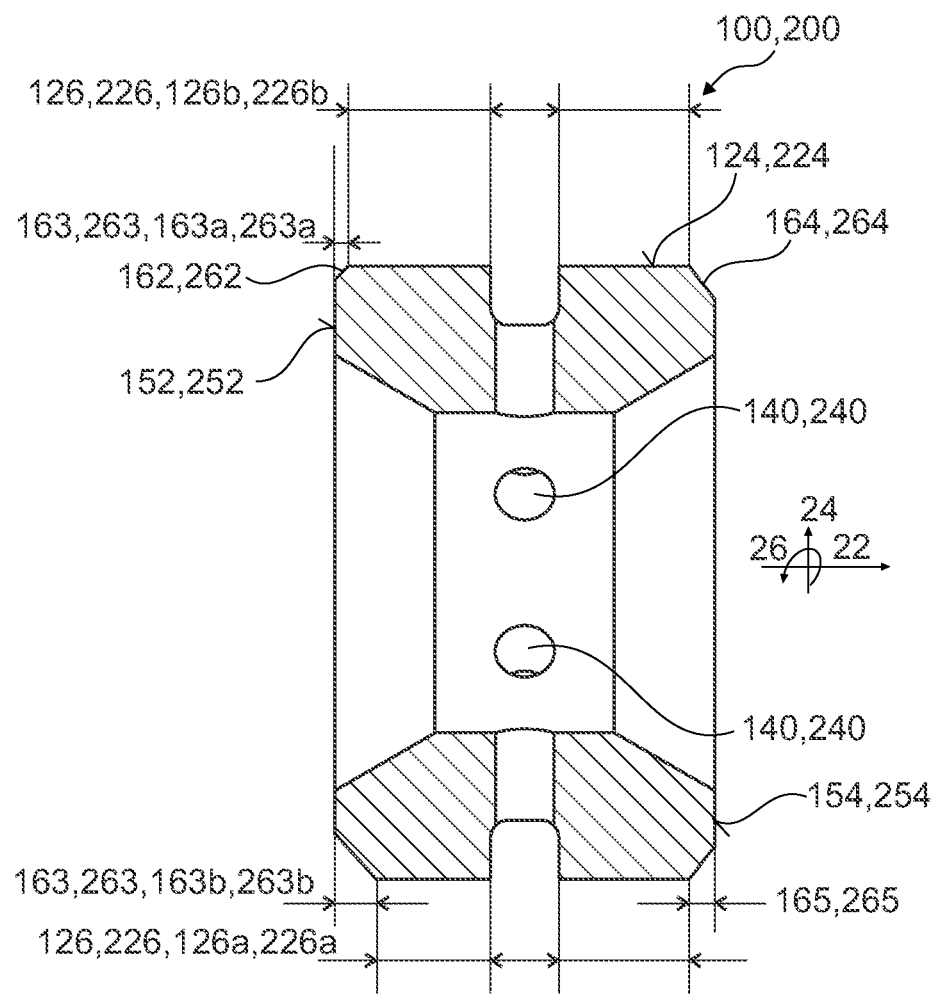

A third main aspect of the fifth refinement is shown in FIGS. 8A-8D, which, for illustrative purposes merely depict one example bearing bushing 100, 200, as these configurations mainly concern features of the bearing bushing 100, 200 whilst the other features of the bearing assembly 10 may be configured according to any configuration as already explained further above. According to this third main aspect of the fifth refinement, a width 163, 165, 263, 265 of at least one of the chamfers 162, 164, 262, 264 of the compressor-side bearing bushing 100 or of the turbine-side bearing bushing 200 varies in the circumferential direction 26. In this regard, FIG. 8D shows a bearing bushing 100, 200, wherein only the width 163, 263 of the first chamfer 162, 262 varies in the circumferential direction 26 whilst the width 165, 265 of the second chamfer 164, 264 is constant. FIGS. 8A-8C show another configuration, wherein only the widths 163, 263, 165, 265 of both chamfers 162, 262, 164, 264 are varied in the circumferential direction 26. In any of the shown configurations, the width(s) 163, 165, 263, 265 are varied such that also the width 126,226 of the outer jacket surface 124, 126 is varied in circumferential direction 26. The width(s) 163, 165, 263, 265 are thereby varied between a minimum width 163a, 165a, 263a, 265a and a maximum width 163b, 165b, 263b, 265b. Thereby, also the surface width 126, 226 of the outer jacket surface 124, 224 is varied constantly between a minimum width 126a, 226a and a maximum width 126b, 226b (see, FIGS. 8B-8D). As already explained further above, one of the bearing bushings 100, 200, i.e. either the compressor-side bearing bushing 100 or the turbine-side bearing bushing 200 is is configured with a varying chamfer width 163, 263, this results in different surface areas of the outer jacket surfaces 124, 224.

Thereby, different rotational speeds of the bearing bushings 100, 200 during operation are achieved. Furthermore, by having a variance of the width 126, 226 of the outer jacket surface 124, 224 on one of the bearing bushings 100, 200 a non-uniform bearing load over the outer circumference 114, 214 of that respective bearing bushing 100, 200 can be achieved. In that, the superposition of natural frequencies of the lubricant can be disturbed, i.e. the synchronization effects can be prevented. As can be best seen in FIG. 8A the widths 163, 263, 165, 265 vary constantly between the minimum width 163*a* 263*a*, 165*a*, 265*a* and the maximum width 163*b*, 263*b*, 165*b*, 265*b*. In alternative configurations (not shown), the widths 163, 263, 165, 265 vary not constantly, i.e. may comprise jumps or waves, between the minimum width 163*a* 263*a*, 165*a*, 265*a* and the maximum width 163*b*, 263*b*, 165*b*, 265*b* In the example configuration of FIGS. 8A-8C, the maximum width 163*b*, 263*b* of the first chamfer 126, 262 is arranged at the same circumferential position as the maximum width 165*b*, 265*b* of the second chamfer 164, 264. Also, the minimum width 163*a*, 263*a* of the first chamfer 126, 262 is arranged at the same circumferential position as the minimum width 165*a*, 265*a* of the second chamfer 164, 264. In alternative configurations (not shown), maximum width 163*b*, 263*b* of the first chamfer 126, 262 may be arranged at a different circumferential position as the maximum width 165*b*, 265*b* of the second chamfer 164, 264. Also, the minimum width 163*a*, 263*a* of the first chamfer 126, 262 may be arranged at a different circumferential position as the minimum width 165*a*, 265*a* of the second chamfer 164, 264. The size of the maximum width 163*b*, 263*b* of the first chamfer 126, 262 is the same as the size of maximum width 165*b*, 265*b* of the second chamfer 164, 264. The size of the minimum width 163*a*, 263*a* of the first chamfer 126, 262 is the same as the size of the minimum width 165*a*, 265*a* of the second chamfer 164, 264. In alternative configurations, the size of the maximum width 163*b*, 263*b* of the first chamfer 126, 262 may be different than the size of maximum width 165*b*, 265*b* of the second chamfer 164, 264. In alternative configurations, the size of the minimum width 163*a*, 263*a* of the first chamfer 126, 262 may be different than the size of the minimum width 165*a*, 265*a* of the second chamfer 164, 264. In alternative configurations (not shown), the width 163, 263, 165, 265 of at least one of the chamfers 162, 262, 164, 264 of the bearing bushings 100, 200 may not vary in the circumferential direction 26 but may just be smaller than the widths of the other chamfers 162, 262, 164, 264 such that a reduced surface area of the respective outer jacket surface 124, 224 is achieved.

The second embodiment of the present invention is very similar to the fifth refinement of the first embodiment. Whilst in all three main aspects of the fifth embodiment, only one of the compressor-side bearing bushing 100 or the turbine-side bearing bushing 200 is correspondingly configured, in the second embodiment both bearing bushings 100, 200 may comprise one or more features of the fifth refinement. Thereby, the bearing bushings 100, 200 of the second embodiment may also be configured identically, however, they should at least comprise one of the features of the fifth refinement which results in a varying profile of the outer jacket surface 124, 224. That means the profile of width 126 of the compressor-side outer jacket surface 124 and the profile of width 226 of the turbine-side outer jacket surface 224 vary in the circumferential direction 26. This leads to different profiles of breaking torque and non-uniform bearing loads at different circumferential positions on the respective outer jacket surface 124, 224. Thereby, a desynchronization of the compressor-side bearing bushing 100 from the turbine-side bearing bushing 200 can be achieved which can disturb the superposition of natural frequencies of the lubricant on both sides, i.e. the synchronization effects can be prevented. By disturbing synchronization effects, the acoustic and vibration transfer into the periphery can be limited, and thus, an improved NVH behavior can be achieved.

Figure 7B:
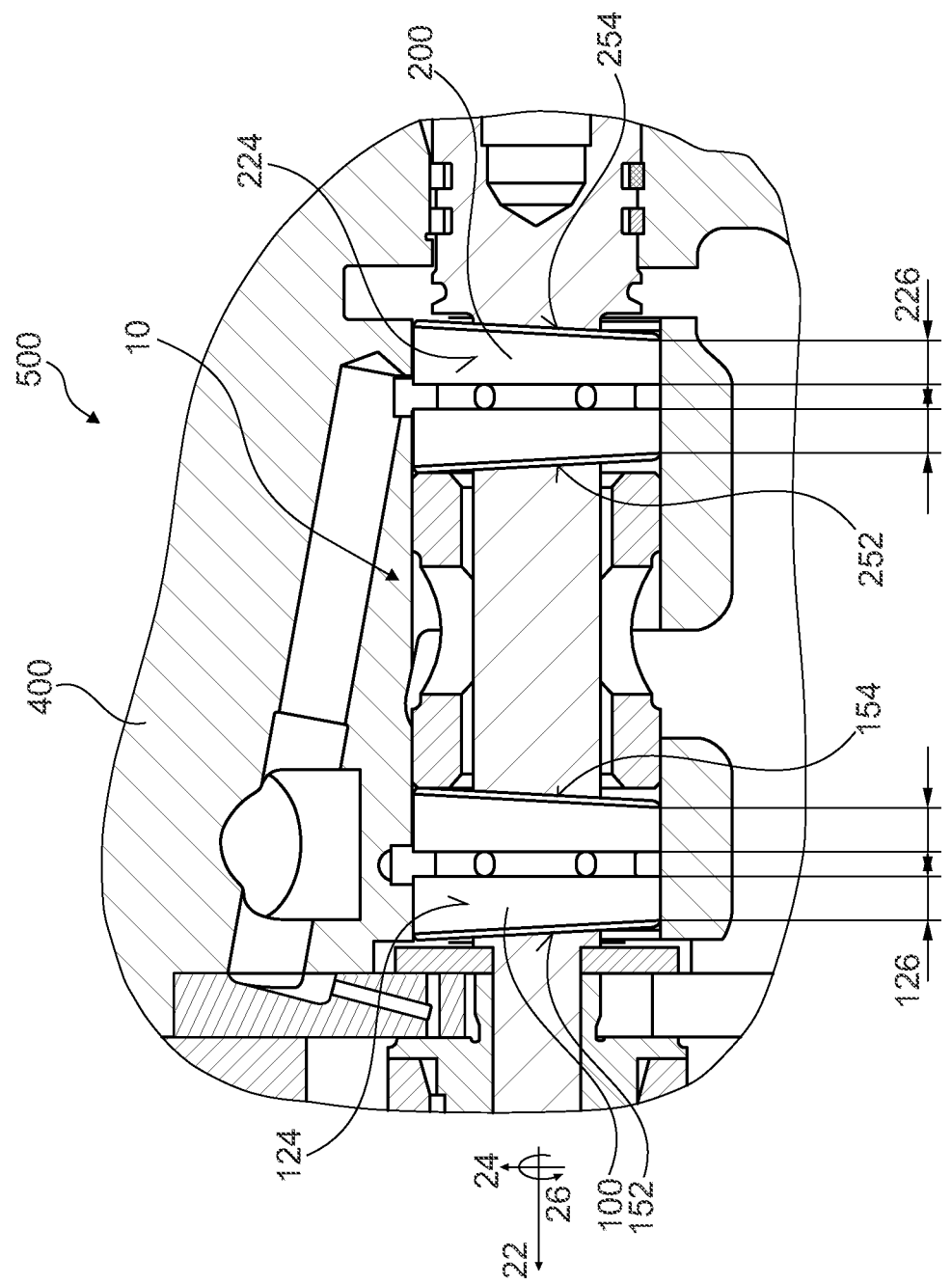
FIG. 7B shows a detailed sectional view of the bearing assembly according to a second main aspect of the second embodiment including bearing bushings according to second main aspect of the fifth refinement of FIG. 7A.

In that instance, FIG. 7B shows an example configuration of a bearing assembly 10 comprising two bearing bushings 100, 200 which are configured according the second main aspect of the fifth refinement described with respect to FIG. 7A further above. Thus, all features of the second main aspect of the fifth refinement apply to this configuration, with the addition that both, the compressor-side bearing bushing 100 and the turbine-side bearing bushing 200 can comprise some or more of those features.

Figure 8E:
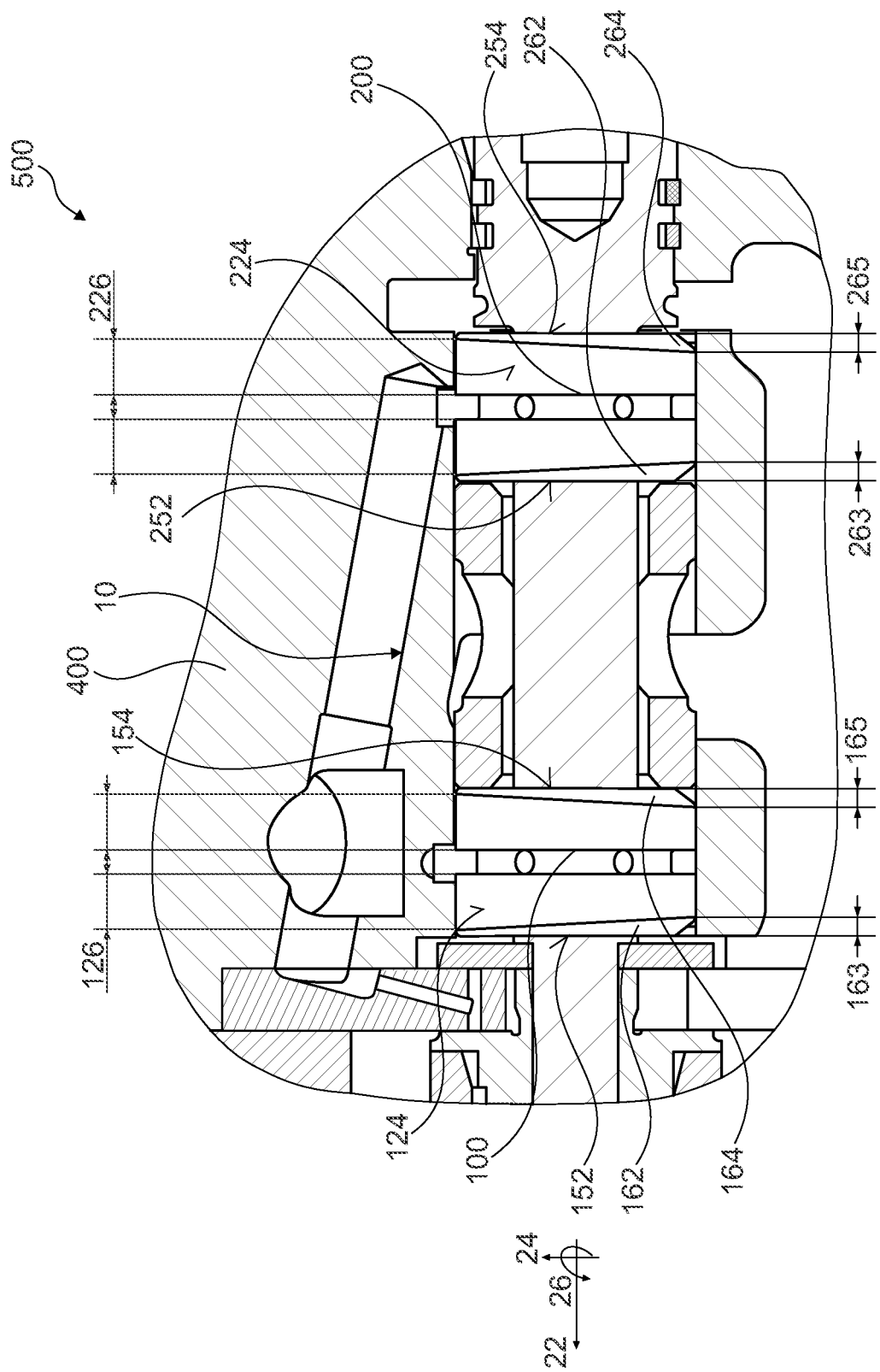
FIG. 8E shows a detailed sectional view of the bearing assembly according to a third main aspect of the second embodiment including bearing bushings according to third main aspect of the fifth refinement of FIGS. 8A-8D.

Furthermore FIG. 8E shows an example configuration of a bearing assembly 10 comprising two bearing bushings 100, 200 which are configured according the third main aspect of the fifth refinement described with respect to FIGS. 8A-8D further above. Thus, all features of the third main aspect of the fifth refinement apply to this configuration, with the addition that both, the compressor-side bearing bushing 100 and the turbine-side bearing bushing 200 can comprise some or more of those features.

Analogously, but not explicitly shown in the figures, also the first main aspect of the fifth refinement described with respect to FIGS. 6A-6F further above, are applicable to the second embodiment in another configuration. Thus, all features of the first main aspect of the fifth refinement apply to this configuration, with the addition that both, the compressor-side bearing bushing 100 and the turbine-side bearing bushing 200 can comprise some or more of those features.

In general, any configuration of the second embodiment can also be combined with any configuration of the first embodiment in order to increase the advantageous effects of disturbing synchronization effects.

REFERENCE SIGN LIST

| | |
|---|---|
| 10 | Bearing assembly |
| 22 | Axial direction |
| 24 | Radial direction |
| 26 | Circumferential direction |
| 100 | Compressor-side bearing bushing |
| 112 | Compressor-side inner circumference |
| 113 | Compressor-side inner lubrication gap |
| 114 | Compressor-side outer circumference |
| 115 | Compressor-side outer lubrication gap |
| 122 | Compressor-side inner jacket surface |
| 124 | Compressor-side outer jacket surface |
| 126, 126a, 126b | Compressor-side outer jacket surface width; minimum; maximum |
| 130 | Compressor-side circumferential lubricant groove |
| 134 | Compressor-side groove depth |
| 136 | Compressor-side groove width |
| 140 | Compressor-side lubricant supply bore |
| 144 | Compressor-side bore depth |
| 152 | Compressor-side first ring face |
| 154 | Compressor-side second ring face |
| 156, 156a, 156b | Compressor-side scallop |
| 162 | Compressor-side first chamfer |
| 163, 163a, 163b | Compressor-side first chamfer width; minimum; maximum |
| 164 | Compressor-side second chamfer |
| 165, 165a, 165b | Compressor-side second chamfer width |
| 200 | Turbine-side bearing bushing |
| 212 | Turbine-side inner circumference |
| 213 | Turbine-side inner lubrication gap |

| | |
|---|---|
| 214 | Turbine-side outer circumference |
| 215 | Turbine-side outer lubrication gap |
| 222 | Turbine-side inner jacket surface |
| 224 | Turbine-side outer jacket surface |
| 226, 226a, 226b | Turbine-side surface width; minimum; maximum |
| 230 | Turbine-side circumferential lubricant groove |
| 234 | Turbine-side groove depth |
| 236 | Turbine-side groove width |
| 240 | Turbine-side lubricant supply bore |
| 244 | Turbine-side bore depth |
| 252 | Turbine-side first ring face |
| 254 | Turbine-side second ring face |
| 256, 256a, 256b | Turbine-side scallop |
| 262 | Turbine-side first chamfer |
| 263, 263a, 263b | Turbine-side first chamfer width; minimum; maximum |
| 264 | Turbine-side second chamfer |
| 265, 265a, 265b | Turbine-side second chamfer width; minimum; maximum |
| 300 | Spacer |
| 400 | Bearing housing |
| 410 | Bearing bore |
| 412 | Inner surface of bearing bore |
| 424 | First supply channel |
| 425 | First supply groove |
| 426 | Second supply channel |
| 427 | Second supply groove |
| 500 | Charging apparatus |
| 510 | Compressor |
| 512 | Compressor housing |
| 514 | Impeller |
| 520 | Turbine |
| 522 | Turbine housing |
| 524 | Turbine wheel |
| 530 | Shaft |

It should be understood that the present invention can also (alternatively) be defined in accordance with the following configurations:

1. A bearing assembly (10) for a charging apparatus (500) comprising:
    a bearing housing (400),
    a shaft (530),
    a compressor-side bearing bushing (100) and a turbine-side bearing bushing (200) which together support the shaft (530) inside a bearing bore (410) of the bearing housing (400),
    characterized in that
    the compressor-side bearing bushing (100) is configured differently than the turbine-side bearing bushing (200).
2. The bearing assembly (10) of configuration 1, wherein a compressor-side outer lubrication gap (115) of the compressor-side bearing bushing (100) is smaller than a turbine-side outer lubrication gap (215) of the turbine-side bearing bushing (200).
3. The bearing assembly (10) of any one of configurations 1 or 2, wherein the turbine-side outer lubrication gap (215) is at least 6.5% and preferably around 10% larger than the compressor-side outer lubrication gap (115).
4. The bearing assembly (10) of any one of the previous configurations, wherein a compressor-side inner lubrication gap (113) of the compressor-side bearing bushing (100) is equal to a turbine-side inner lubrication gap (213) of the turbine-side bearing bushing (200).
5. The bearing assembly (10) of any one of the previous configurations, wherein a depth (134) of a compressor-side circumferential lubricant groove (130) of the compressor-side bearing bushing (100) is different than a depth (234) of a turbine-side circumferential lubricant groove (230) of the turbine-side bearing bushing (200).
6. The bearing assembly (10) of configuration 5, wherein the depth (234) of the turbine-side circumferential lubricant groove (230) is smaller than the depth (134) of the compressor-side circumferential lubricant groove (130).
7. The bearing assembly (10) of any one of configurations 5 or 6, wherein the depth (234) of the turbine-side circumferential lubricant groove (230) is 5% to 90%, preferably 15% to 80% and most preferably 25% to 50% smaller than the depth (134) of the compressor-side circumferential lubricant groove (130).
8. The bearing assembly (10) of configuration 5, wherein the depth (134) of the compressor-side circumferential lubricant groove (130) is smaller than the depth (234) of the turbine-side circumferential lubricant groove (230).
9. The bearing assembly (10) of any one of configurations 5 or 8, wherein the depth (134) of the compressor-side circumferential lubricant groove (130) is 5% to 90%, preferably 15% to 80% and most preferably 25% to 50% smaller than the depth (234) of the turbine-side circumferential lubricant groove (230).
10. The bearing assembly (10) of any one of the previous configurations, wherein a width (136) of a compressor-side circumferential lubricant groove (130) of the compressor-side bearing bushing (100) is different than a width (236) of a turbine-side circumferential lubricant groove (230) of the turbine-side bearing bushing (200).
11. The bearing assembly (10) of configuration 10, wherein the width (236) of the turbine-side circumferential lubricant groove (230) is smaller than the width (136) of the compressor-side circumferential lubricant groove (130).
12. The bearing assembly (10) of any one of configurations 10 or 11, wherein the width (236) of the turbine-side circumferential lubricant groove (230) is 5% to 50%, preferably 10% to 40% and most preferably 15% to 25% smaller than the width (136) of the compressor-side circumferential lubricant groove (130).
13. The bearing assembly (10) of configuration 10, wherein the width (136) of the compressor-side circumferential lubricant groove (130) is smaller than the width (236) of the turbine-side circumferential lubricant groove (230).
14. The bearing assembly (10) of any one of configurations 10 or 13, wherein the width (136) of the compressor-side circumferential lubricant groove (130) is 5% to 50%, preferably 10% to 40% and most preferably 15% to 25% smaller than the width (236) of the turbine-side circumferential lubricant groove (230).
15. The bearing assembly (10) of any one of the previous configurations, wherein a number of lubricant supply bores (140) of the compressor-side bearing bushing (100) differs from a number of lubricant supply bores (240) of the turbine-side bearing bushing (200).
16. The bearing assembly (10) of configuration 15, wherein the number of lubricant supply bores (140) of the compressor-side bearing bushing (100) is smaller than the number lubricant supply bores (240) of the turbine-side bearing bushing (200), and optionally, wherein the compressor-side bearing bushing (100) comprises at least one lubricant supply bore (140) less than the turbine-side bearing bushing (200).
17. The bearing assembly (10) of any one of configurations 15 or 16, wherein the compressor-side bearing bushing (100) comprises at least two lubricant supply bores (140) less than the turbine-side bearing bushing (200), and optionally, wherein the compressor-side bearing bushing (100) comprises four lubricant supply bores (140) and the turbine-side bearing bushing (200) comprises six lubricant supply bores (240).

18. The bearing assembly (10) of configuration 15, wherein the number lubricant supply bores (140) of the compressor-side bearing bushing (100) is larger than the number lubricant supply bores (240) of the turbine-side bearing bushing (200), and optionally, wherein the compressor-side bearing bushing (100) comprises at least one lubricant supply bore (140) more than the turbine-side bearing bushing (200).

19. The bearing assembly (10) of any one of configurations 15 or 18, wherein the compressor-side bearing bushing (100) comprises at least two lubricant supply bores (140) more than the turbine-side bearing bushing (200), and optionally, wherein the compressor-side bearing bushing (100) comprises six lubricant supply bores (140) and the turbine-side bearing bushing (200) comprises four lubricant supply bores (240).

20. The bearing assembly (10) of any one of the previous configurations, wherein one of a compressor-side outer jacket surface (124) of the compressor-side bearing bushing (100) or a turbine-side outer jacket surface (224) of the turbine-side bearing bushing (200) varies in width (126, 226) along an outer circumference (114, 214).

21. The bearing assembly (10) of configuration 20, wherein the compressor-side bearing bushing (100) comprises a first ring face (152) and a second ring face (154) opposing the first ring face (152), and wherein the turbine-side bearing bushing (200) comprises a first ring face (252) and a second ring face (254) opposing the first ring face (252), and optionally, wherein the first ring face (152) of the compressor-side bearing bushing (100) faces in the same direction as the first ring face (252) of the turbine-side bearing bushing (200).

22. The bearing assembly (10) of configuration 21, wherein at least one of the ring faces (152, 154, 252, 254) of the compressor-side bearing bushing (100) or of the turbine-side bearing bushing (200) comprises at least one scallop (156, 156a, 156b, 256, 156a, 256b), in particular at least two scallops (156, 156a, 156b, 256, 156a, 256b), and optionally, wherein at least one of the at least two scallops (156, 156a, 156b, 256, 156a, 256b) comprises a different size than another one of the at least two scallops (156, 156a, 156b, 256, 156a, 256b).

23. The bearing assembly (10) of any one of configurations 21 or 22, wherein the first ring face (152) and the second ring face (154) of the compressor-side bearing bushing (100) or wherein the first ring face (252) and the second ring face (254) of the turbine-side bearing bushing (200) comprise at least one scallop (156, 156a, 156b, 256, 156a, 256b), in particular at least two scallops (156, 156a, 156b, 256, 156a, 256b), and optionally, wherein at least one of the at least two scallops (156, 156a, 156b, 256, 156a, 256b) comprises a different size than another one of the at least two scallops (156, 156a, 156b, 256, 156a, 256b).

24. The bearing assembly (10) of any one of configurations 20 to 23, wherein a plurality of scallops (156, 156a, 156b, 256, 156a, 256b) is arranged on the respective ring face (152, 154, 252, 254).

25. The bearing assembly (10) of configuration 24, wherein the plurality of scallops (156, 156a, 156b, 256, 156a, 256b) is distributed equally spaced on the respective ring face (152, 154, 252, 254) in a circumferential direction (26).

26. The bearing assembly (10) of configuration 24, wherein the plurality of scallops (156, 156a, 156b, 256, 156a, 256b) is distributed unequally spaced on the respective ring face (152, 154, 252, 254) in a circumferential direction (26).

27. The bearing assembly (10) of configuration 21, wherein at least one of the ring faces (152, 154, 252, 254) of the compressor-side bearing bushing (100) or of the turbine-side bearing bushing (200) is inclined with respect to a radial plane such that the respective width (126, 226) varies, in particular varies constantly, between a minimum width (126a, 226a) and a maximum width (126b, 226b) of the respective compressor-side outer jacket surface (124) or the turbine-side outer jacket surface (224).

28. The bearing assembly (10) of any one of configurations 21 or 27, wherein the first ring face (152) and the second ring face (154) of the compressor-side bearing bushing (100) or wherein the first ring face (252) and the second ring face (254) of the turbine-side bearing bushing (200) are inclined with respect to a radial plane such that the respective width (126, 226) varies, in particular varies constantly, between a minimum width (126a, 226a) and a maximum width (126b, 226b) of the compressor-side outer jacket surface (124) or the turbine-side outer jacket surface (224), respectively.

29. The bearing assembly (10) of configuration 28, wherein the respective first ring face (152, 252) is inclined in an opposite direction to the respective second ring face (154, 254).

30. The bearing assembly (10) of configuration 28, wherein the respective first ring face (152, 252) is inclined in the same direction as the respective second ring face (154, 254) but by a different amount.

31. The bearing assembly (10) of any one of configurations 27 to 30, wherein the minimum width (126a, 226a) is 55% to 99%, preferably 75% to 95% and most preferably 85% to 90% of the maximum width (126b, 226b).

32. The bearing assembly (10) of any one of configurations 20 or 21, wherein the compressor-side bearing bushing (100) comprises a first chamfer (162) and a second chamfer (164) opposing the first chamfer (162), and wherein the turbine-side bearing bushing (200) comprises a first chamfer (262) and a second chamfer (264) opposing the first chamfer (262), and optionally, wherein the first chamfer (162) of the compressor-side bearing bushing (100) faces in the same direction as the first chamfer (262) of the turbine-side bearing bushing (200).

33. The bearing assembly (10) of configuration 32, wherein a width (163, 165, 263, 265) of at least one of the chamfers (162, 164, 262, 264) of the compressor-side bearing bushing (100) or of the turbine-side bearing bushing (200) varies in the circumferential direction (26).

34. The bearing assembly (10) of configuration 33, wherein the width (163, 165, 263, 265) of at least one of the chamfers (162, 164, 262, 264) varies, in particular varies constantly, between a minimum width (163a, 165a, 263a, 265a) and a maximum width (163b, 165b, 263b, 265b).

35. The bearing assembly (10) of any one of configurations 33 or 34, wherein the width (163) of the first chamfer (162) and the width (165) of the second chamfer (164) of the compressor-side bearing bushing (100) or wherein the width (263) of the first chamfer (262) and the width (265) of the second chamfer (264) of the turbine-side bearing bushing (200) vary in the circumferential direction (26).

36. The bearing assembly (10) of configuration 35, wherein the respective widths (163, 165) of the chamfers (162, 164) of the compressor-side bearing bushing (100) vary, in particular vary constantly, between a minimum width (163a, 165a) and a maximum width (163b, 165b), and optionally, wherein the respective maximum widths (163b, 165b) are arranged at the same circumferential position.

37. The bearing assembly (10) of configuration 36, wherein the respective minimum widths (163*a*, 165*a*) and/or the respective maximum widths (163*b*, 165*b*) are the same.
38. The bearing assembly (10) of configuration 35, wherein the respective widths (263, 265) of the chamfers (262, 264) of the turbine-side bearing bushing (200) vary, in particular constantly vary, between a minimum width (263*a*, 265*a*) and a maximum width (263*b*, 265*b*) and optionally, wherein the respective maximum widths (263*b*, 265*b*) are arranged at the same circumferential position.
39. The bearing assembly (10) of configuration 38, wherein the respective minimum widths (263*a*, 265*a*) and/or the respective maximum widths (263*b*, 265*b*) are the same.
40. The bearing assembly (10) of any one of the previous configurations, wherein the bearing bushings (100, 200) are configured to achieve different rotation speeds during operation.
41. The bearing assembly (10) of any one of the previous configurations, wherein each of the compressor-side bearing bushing (100) and the turbine-side bearing bushing (200) is a full-floating bushing type.
42. The bearing assembly (10) of any one of the previous configurations, wherein the shaft (530) rotatably couples a turbine wheel (524) of a turbine (520) to an impeller (514) of a compressor (510).
43. The bearing assembly (10) of any one of the previous configurations, further comprising a spacer (300) arranged axially between the compressor-side bearing bushing (100) and the turbine-side bearing bushing (200).
44. The bearing assembly (10) of any one of the previous configurations, wherein the compressor-side bearing bushing (100) and/or the turbine-side bearing bushing (200) comprise a plurality of lubricant supply bores (140, 240).
45. The bearing assembly (10) of any one of the previous configurations, wherein the compressor-side bearing bushing (100) and/or the turbine-side bearing bushing (200) comprise a circumferential lubricant groove (130, 230).
46. The bearing assembly (10) of any one of the previous configurations, wherein the bearing housing (400) comprises a first supply groove (425) provided on an inner surface (412) of the bearing bore (410) and/or a second supply groove (427) provided on the inner surface (412) of the bearing bore (410).
47. A charging apparatus (500) comprising:
a compressor (510) with a compressor housing (512) and an impeller (514) rotatable therein,
a drive unit which is rotatably coupled to the impeller (514) via the shaft (530),
characterized in that the charging apparatus (500) further comprises a bearing assembly (10) of any one of the previous configurations which rotatably supports the shaft (530).
48. The charging apparatus (500) of configuration 47, wherein the drive unit comprises a turbine (520) and/or an electric motor configured to drive the shaft (530).
49. A bearing assembly (10) for a charging apparatus (500) comprising:
a bearing housing (400),
a shaft (530),
a compressor-side bearing bushing (100) and a turbine-side bearing bushing (200) which together support the shaft (530) inside a bearing bore (410) of the bearing housing (400),
characterized in that
a compressor-side outer jacket surface (124) of the compressor-side bearing bushing (100) and a turbine-side outer jacket surface (224) of the turbine-side bearing bushing (200) vary in width (126, 226) along an outer circumference (114, 124).
50. The bearing assembly (10) of configuration 49, wherein the compressor-side bearing bushing (100) comprises a first ring face (152) and a second ring face (154) opposing the first ring face (152), and wherein the turbine-side bearing bushing (200) comprises a first ring face (252) and a second ring face (254) opposing the first ring face (252), and optionally, wherein the first ring face (152) of the compressor-side bearing bushing (100) faces in the same direction as the first ring face (252) of the turbine-side bearing bushing (200).
51. The bearing assembly (10) of configuration 50, wherein at least one of the ring faces (152, 154, 252, 254) of the compressor-side bearing bushing (100) and of the turbine-side bearing bushing (200) respectively comprise at least two scallops (156, 156*a*, 156*b*, 256, 156*a*, 256*b*), wherein at least one of the at least two scallops (156, 156*a*, 156*b*, 256, 156*a*, 256*b*) comprises a different size than another one of the at least two scallops (156, 156*a*, 156*b*, 256, 156*a*, 256*b*).
52. The bearing assembly (10) of any one of configurations 50 or 51, wherein the first ring face (152) and the second ring face (154) of the compressor-side bearing bushing (100) and the first ring face (252) and the second ring face (254) of the turbine-side bearing bushing (200) respectively comprise at least two scallops (156, 156*a*, 156*b*, 256, 156*a*, 256*b*) wherein at least one of the at least two scallops (156, 156*a*, 156*b*, 256, 156*a*, 256*b*) comprises a different size than another one of the at least two scallops (156, 156*a*, 156*b*, 256, 156*a*, 256*b*).
53. The bearing assembly (10) of any one of configurations 49 to 52, wherein a plurality of scallops (156, 156*a*, 156*b*, 256, 156*a*, 256*b*) is arranged on the respective ring face (152, 154, 252, 254).
54. The bearing assembly (10) of configuration 53, wherein the plurality of scallops (156, 156*a*, 156*b*, 256, 156*a*, 256*b*) is distributed equally spaced on the respective ring face (152, 154, 252, 254) in a circumferential direction (26).
55. The bearing assembly (10) of configuration 53, wherein the plurality of scallops (156, 156*a*, 156*b*, 256, 156*a*, 256*b*) is distributed unequally spaced on the respective ring face (152, 154, 252, 254) in a circumferential direction (26).
56. The bearing assembly (10) of configuration 50, wherein at least one of the ring faces (152, 154, 252, 254) of the compressor-side bearing bushing (100) and of the turbine-side bearing bushing (200) is inclined with respect to a radial plane such that the respective width (126, 226) varies, in particular varies constantly, between a minimum width (126*a*, 226*a*) and a maximum width (126*b*, 226*b*) of the compressor-side outer jacket surface (124) and the turbine-side outer jacket surface (224), respectively.
57. The bearing assembly (10) of any one of configurations 50 or 56, wherein the first ring face (152) and the second ring face (154) of the compressor-side bearing bushing (100) and the first ring face (252) and the second ring face (254) of the turbine-side bearing bushing (200) are inclined with respect to a radial plane such that the respective width (126, 226) varies, in particular varies constantly, between a minimum width (126*a*, 226*a*) and a maximum width (126b, 226b) of the respective compressor-side outer jacket surface (124) and the turbine-side outer jacket surface (224).

58. The bearing assembly (10) of configuration 57, wherein the first ring face (152) of the compressor-side bearing bushing (100) is inclined in an opposite direction to the second ring face (154) of the compressor-side bearing bushing (100) and/or wherein the first ring face (252) of the turbine-side bearing bushing (200) is inclined in an opposite direction to the second ring face (254) of the turbine-side bearing bushing (200).

59. The bearing assembly (10) of configuration 57, wherein the first ring face (152) of the compressor-side bearing bushing (100) is inclined in the same direction to the second ring face (154) of the compressor-side bearing bushing (100) but by a different amount and/or wherein the first ring face (252) of the turbine-side bearing bushing (200) is inclined in the same direction to the second ring face (254) of the turbine-side bearing bushing (200) but by a different amount.

60. The bearing assembly (10) of any one of configurations 56 to 59, wherein the minimum width (126a, 226a) is 55% to 99%, preferably 75% to 95% and most preferably 85% to 90% of the maximum width (126b, 226b).

61. The bearing assembly (10) of any one of configurations 49 or 50, wherein the compressor-side bearing bushing (100) comprises a first chamfer (162) and a second chamfer (164) opposing the first chamfer (162), and wherein the turbine-side bearing bushing (200) comprises a first chamfer (262) and a second chamfer (264) opposing the first chamfer (262), and optionally, wherein the first chamfer (162) of the compressor-side bearing bushing (100) faces in the same direction as the first chamfer (262) of the turbine-side bearing bushing (200).

62. The bearing assembly (10) of configuration 61, wherein a width (163, 165) of at least one of the chamfers (162, 164) of the compressor-side bearing bushing (100) varies in the circumferential direction (26) and wherein a width (263, 265) of at least one of the chamfers (262, 264) of the turbine-side bearing bushing (200) varies in the circumferential direction (26).

63. The bearing assembly (10) of configuration 62, wherein the width (163, 165) of at least one of the chamfers (162, 164) of the compressor-side bearing bushing (100) varies, in particular varies constantly in the circumferential direction (26), between a minimum width (163a, 165a) and a maximum width (163b, 165b) and wherein the width (263, 265) of at least one of the chamfers (262, 264) of the turbine-side bearing bushing (200) varies, in particular varies constantly, in the circumferential direction (26), between a minimum width (263a, 265a) and a maximum width (263b, 265b).

64. The bearing assembly (10) of any one of configurations 62 or 63, wherein both the width (163) of the first chamfer (162) and the width (165) of the second chamfer (164) of the compressor-side bearing bushing (100) vary, in particular vary constantly, in the circumferential direction (26), between a minimum width (163a, 165a) and a maximum width (163b, 165b), and optionally, wherein the respective maximum widths (163b, 165b) are arranged at the same circumferential position.

65. The bearing assembly (10) of configuration 64, wherein the respective minimum widths (163a, 165a) and/or the respective maximum widths (163b, 165b) are the same.

66. The bearing assembly (10) of any one of configurations 62 to 65, wherein both the width (263) of the first chamfer (262) and the width (265) of the second chamfer (264) of the turbine-side bearing bushing (200) vary, in particular vary constantly, in the circumferential direction (26), between a minimum width (263a, 265a) and a maximum width (263b, 265b) and optionally, wherein the respective maximum widths (263b, 265b) are arranged at the same circumferential position.

67. The bearing assembly (10) of configuration 66, wherein the respective minimum widths (263a, 265a) and/or the respective maximum widths (263b, 265b) are the same.

68. The bearing assembly (10) of any one of the previous configurations, wherein each of the compressor-side bearing bushing (100) and the turbine-side bearing bushing (200) is a full-floating bushing type.

69. The bearing assembly (10) of any one of the previous configurations, wherein the shaft (530) rotatably couples a turbine wheel (524) of a turbine (520) to an impeller (514) of a compressor (510).

70. The bearing assembly (10) of any one of the previous configurations, further comprising a spacer (300) arranged axially between the compressor-side bearing bushing (100) and the turbine-side bearing bushing (200).

71. The bearing assembly (10) of any one of the previous configurations, wherein the compressor-side bearing bushing (100) and/or the turbine-side bearing bushing (200) comprise a plurality of lubricant supply bores (140, 240).

72. The bearing assembly (10) of any one of the previous configurations, wherein the compressor-side bearing bushing (100) and/or the turbine-side bearing bushing (200) comprise a circumferential lubricant groove (130, 230).

73. The bearing assembly (10) of any one of the previous configurations, wherein the bearing housing (400) comprises a first supply groove (425) provided on an inner surface (412) of the bearing bore (410) and/or a second supply groove (427) provided on the inner surface (412) of the bearing bore (410).

74. A charging apparatus (500) comprising:
a compressor (510) with a compressor housing (512) and an impeller (514) rotatable therein,
a drive unit which is rotatably coupled to the impeller (514) via the shaft (530),
characterized in that the charging apparatus (500) further comprises a bearing assembly (10) of any one of the previous configurations which rotatably supports the shaft (530).

75. The charging apparatus (500) of configuration 74, wherein the drive unit comprises a turbine (520) and/or an electric motor configured to drive the shaft (530).

The invention claimed is:

1. A bearing assembly (10) for a charging apparatus (500) comprising:
a bearing housing (400),
a shaft (530),
a compressor-side bearing bushing (100) and a turbine-side bearing bushing (200) which together support the shaft (530) inside a bearing bore (410) of the bearing housing (400), wherein the compressor-side bearing bushing (100) is configured differently than the turbine-side bearing bushing (200), wherein a compressor-side outer lubrication gap (115) between the compressor-side bearing bushing (100) and the bearing bore (410) is smaller than a turbine-side outer lubrication gap (215) between the turbine-side bearing bushing (200) and the bearing bore (410), and wherein a compressor-side inner lubrication gap (113) between the compressor-side bearing bushing (100) and the shaft (530) is equal to a turbine-side inner lubrication gap (213) between the turbine-side bearing bushing (200) and the shaft (530).

2. The bearing assembly (10) of claim 1, wherein a depth (134) of a compressor-side circumferential lubricant groove (130) which is arranged on an outer jacket surface (124) of the compressor-side bearing bushing (100) is different than a depth (234) of a turbine-side circumferential lubricant groove (230) which is arranged on an outer jacket surface (224) of the turbine-side bearing bushing (200).

3. The bearing assembly (10) of claim 1, wherein a width (136) of a compressor-side circumferential lubricant groove (130) which is arranged on an outer jacket surface (124) of the compressor-side bearing bushing (100) is different than a width (236) of a turbine-side circumferential lubricant groove (230) which is arranged on an outer jacket surface (224) of the turbine-side bearing bushing (200).

4. The bearing assembly (10) of claim 1, wherein each bearing bushing (100, 200) comprises at least one lubricant supply bore (140, 240), and wherein a number of lubricant supply bores (140) of the compressor-side bearing bushing (100) differs from a number lubricant supply bores (240) of the turbine-side bearing bushing (200).

5. The bearing assembly (10) of claim 4, wherein the number of lubricant supply bores (140) of the compressor-side bearing bushing (100) is smaller than the number of lubricant supply bores (240) of the turbine-side bearing bushing (200).

6. The bearing assembly (10) of claim 4, wherein the number lubricant supply bores (140) of the compressor-side bearing bushing (100) is larger than the number lubricant supply bores (240) of the turbine-side bearing bushing (200).

7. The bearing assembly (10) of claim 1, wherein one of a compressor-side outer jacket surface (124) of the compressor-side bearing bushing (100) or a turbine-side outer jacket surface (224) of the turbine-side bearing bushing (200) varies in width (126, 226) along an outer circumference (114, 214).

8. The bearing assembly (10) of claim 7, wherein the compressor-side bearing bushing (100) comprises a first ring face (152) and a second ring face (154) opposing the first ring face (152), and wherein the turbine-side bearing bushing (200) comprises a first ring face (252) and a second ring face (254) opposing the first ring face (252).

9. The bearing assembly (10) of claim 8, wherein at least one of the ring faces (152, 154, 252, 254) of the compressor-side bearing bushing (100) or of the turbine-side bearing bushing (200) comprises at least two scallops (156, 156a, 156b, 256, 156a, 256b), and wherein at least one of the at least two scallops (156, 156a, 156b, 256, 156a, 256b) comprises a different size than another one of the at least two scallops (156, 156a, 156b, 256, 156a, 256b).

10. The bearing assembly (10) of claim 8, wherein at least one of the ring faces (152, 154, 252, 254) of the compressor-side bearing bushing (100) or of the turbine-side bearing bushing (200) is inclined with respect to a radial plane such that the respective width (126, 226) varies between a minimum width (126a, 226a) and a maximum width (126b, 226b) of the respective compressor-side outer jacket surface (124) or the turbine-side outer jacket surface (224).

11. The bearing assembly (10) of claim 7, wherein the compressor-side bearing bushing (100) comprises a first chamfer (162) and a second chamfer (164) opposing the first chamfer (162), and wherein the turbine-side bearing bushing (200) comprises a first chamfer (262) and a second chamfer (264) opposing the first chamfer (262).

12. The bearing assembly (10) of claim 11, wherein a width (163, 165, 263, 265) of at least one of the chamfers (162, 164, 262, 264) of the compressor-side bearing bushing (100) or of the turbine-side bearing bushing (200) varies in the circumferential direction (26), such that the width (126, 226) of the compressor-side outer jacket surface (124) or the turbine-side outer jacket surface (224) is varied in the circumferential direction (26), wherein the width (163, 165, 263, 265) of at least one of the chamfers (162, 164, 262, 264) continuously increases from a minimum width (163a, 165a, 263a, 265a) to a maximum width (163b, 165b, 263b, 265b).

13. The bearing assembly (10) of claim 1, wherein both of the compressor-side bearing bushing (100) and the turbine-side bearing bushing (200) are full-floating bushings.

14. A charging apparatus (500) comprising:
a bearing assembly (10) of claim 1,
a compressor (510) with a compressor housing (512) and an impeller (514) rotatable therein,
a drive unit which is rotatably coupled to the impeller (514) via the shaft (530), and wherein the drive unit comprises a turbine (520) which drives the shaft (530).

* * * * *